US011878551B2

United States Patent
Shi et al.

(10) Patent No.: US 11,878,551 B2
(45) Date of Patent: Jan. 23, 2024

(54) OMNIDIRECTIONAL WHEEL AND SCOOTER HAVING OMNIDIRECTIONAL WHEEL

(71) Applicant: Anhui JBH Medical Apparatus Co., Ltd., Anhui Province (CN)

(72) Inventors: Xiuyu Shi, Beijing (CN); Lei Yang, Beijing (CN)

(73) Assignee: ANHUI JBH MEDICAL APPARATUS CO., LTD., Anhui Province (CN)

( * ) Notice: Subject to any disclaimer, the term of this patent is extended or adjusted under 35 U.S.C. 154(b) by 524 days.

(21) Appl. No.: 17/055,436

(22) PCT Filed: Oct. 23, 2020

(86) PCT No.: PCT/CN2020/123127
§ 371 (c)(1),
(2) Date: Nov. 13, 2020

(87) PCT Pub. No.: WO2022/032870
PCT Pub. Date: Feb. 17, 2022

(65) Prior Publication Data
US 2022/0219488 A1    Jul. 14, 2022

(30) Foreign Application Priority Data
Aug. 12, 2020  (CN) .......................... 202010808176.5

(51) Int. Cl.
*B60B 19/00*     (2006.01)
*B62K 17/00*     (2006.01)
*B60B 3/00*      (2006.01)

(52) U.S. Cl.
CPC ............ *B60B 19/003* (2013.01); *B62K 17/00* (2013.01); *B60B 3/00* (2013.01)

(58) Field of Classification Search
CPC ................................................... B60B 19/003
See application file for complete search history.

(56) References Cited

U.S. PATENT DOCUMENTS 4,823,900 A * 4/1989 Farnam ................. B60B 19/003
                                                  180/251
5,383,715 A * 1/1995 Homma .................... B60C 7/00
                                                   301/5.1
(Continued)

FOREIGN PATENT DOCUMENTS

CN        207241302 U     4/2018
CN        109760472 A     5/2019
(Continued)

*Primary Examiner* — Jason R Bellinger
(74) *Attorney, Agent, or Firm* — Scully, Scott, Murphy & Presser, P.C.

(57) ABSTRACT

An omnidirectional wheel and a scooter having an omnidirectional wheel are provided. The omnidirectional wheel includes: a hub; support members, in which the support members are circumferentially distributed on the hub, each of the support members has a first mounting surface and a second mounting surface disposed oppositely, the first mounting surface is provided with a first mounting shaft, the second mounting surface is provided with a second mounting shaft, and a distance between a first axis of the first mounting shaft and a wheel center of the hub is less than a distance between a second axis of the second mounting shaft and the wheel center of the hub; first rollers, in which at least one of the first rollers is rotatably disposed on each first mounting shaft; and second rollers, in which at least one of the second rollers is rotatably disposed on each second mounting shaft.

20 Claims, 26 Drawing Sheets

(56) References Cited

U.S. PATENT DOCUMENTS

| | | | | |
|---|---|---|---|---|
| 9,365,076 | B2* | 6/2016 | Bando | B60B 19/003 |
| 10,675,912 | B1* | 6/2020 | Liang | B60B 19/003 |
| 11,214,093 | B2* | 1/2022 | Murai | B60B 19/125 |
| 11,273,668 | B2* | 3/2022 | Sugimoto | B60B 19/12 |
| 11,511,564 | B2* | 11/2022 | Hirata | A61G 5/1081 |
| 2022/0332141 | A1* | 10/2022 | Jie | B60B 9/00 |

FOREIGN PATENT DOCUMENTS

| | | |
|---|---|---|
| CN | 211032034 U | 7/2020 |
| CN | 212889685 U | 4/2021 |
| JP | 2008-290638 A | 12/2008 |

* cited by examiner

OMNIDIRECTIONAL WHEEL AND SCOOTER HAVING OMNIDIRECTIONAL WHEEL

CROSS-REFERENCE TO RELATED APPLICATIONS

This application is a national phase entry of PCT International Application No. PCT/CN2020/123127, filed on Oct. 23, 2020, which claims priority to Chinese Patent Application No. 202010808176.5, filed on Aug. 12, 2020. The entire disclosure of PCT International Application No. PCT/CN2020/123127 and the entire disclosure of Chinese Patent Application No. 202010808176.5 are incorporated by reference as part of the disclosure of this application.

TECHNICAL FIELD

Embodiments of the present disclosure relate to an omnidirectional wheel and a scooter having an omnidirectional wheel.

BACKGROUND

In existing scooters, in order to ensure the use comfort of the scooters, and adapt to more road conditions and usage scenarios, the scooters usually include omnidirectional wheels. The omnidirectional wheel is a kind of wheel with lateral movement ability, which can freely move laterally while providing circumferential driving force, and the omnidirectional wheel improves the mobility of the scooters.

SUMMARY

At least one embodiment of the present disclosure provides an omnidirectional wheel, and the omnidirectional wheel comprises a hub, a plurality of support members, a plurality of first rollers, and a plurality of second rollers. The plurality of support members are circumferentially distributed on the hub, each of the support members has a first mounting surface and a second mounting surface disposed oppositely, the first mounting surface is provided with a first mounting shaft, the second mounting surface is provided with a second mounting shaft, and a distance between a first axis of the first mounting shaft and a wheel center of the hub is less than a distance between a second axis of the second mounting shaft and the wheel center of the hub. At least one first roller of the first rollers is rotatably disposed on each first mounting shaft; and at least one second roller of the second rollers is rotatably disposed on each second mounting shaft.

For example, in the omnidirectional wheel provided by an embodiment of the present disclosure, along a circumferential direction of a distribution circumference of the plurality of support members, the plurality of first rollers and the plurality of second rollers are disposed at intervals in sequence, one of the second rollers is between two adjacent first rollers, and one of the first rollers is between two adjacent second rollers.

For example, in the omnidirectional wheel provided by an embodiment of the present disclosure, each of the first rollers has a first large diameter end and a first small diameter end, a diameter of the first large diameter end is larger than a diameter of the first small diameter end, and the first small diameter end has an accommodating hole, each of the second rollers has a second large diameter end and a second small diameter end, a diameter of the second large diameter end is larger than a diameter of the second small diameter end, and the second small diameter end of each of the second rollers is at least partially embedded in the accommodating hole of the first small diameter end of an adjacent first roller.

For example, in the omnidirectional wheel provided by an embodiment of the present disclosure, the diameter of the first small diameter end of each of the first rollers is larger than the diameter of the second large diameter end of each of the second rollers.

For example, in the omnidirectional wheel provided by an embodiment of the present disclosure, for a same support member, the first axis of the first mounting shaft is parallel to the second axis of the second mounting shaft.

For example, in the omnidirectional wheel provided by an embodiment of the present disclosure, for a same support member, the first axis of the first mounting shaft and the second axis of the second mounting shaft have an angle less than 180 degrees therebetween.

For example, in the omnidirectional wheel provided by an embodiment of the present disclosure, the hub is provided with a plurality of first grooves, the plurality of first grooves are disposed at intervals along a circumferential direction of a distribution circumference of the plurality of support members, the plurality of first grooves are disposed in one-to-one correspondence with the plurality of support members, each first groove of the first grooves comprises a bottom mounting surface and two side mounting surfaces, the two side mounting surfaces are disposed at intervals along the circumferential direction of the distribution circumference, and each of the first grooves is configured to provide an installation space for a support member corresponding to the first groove, so as to enable the support member to be installed on the hub.

For example, in the omnidirectional wheel provided by an embodiment of the present disclosure, the support member comprises a first base portion that is matched with the first groove, the first base portion comprises a base bottom surface and two base side surfaces on both sides of the base bottom surface, and the first base portion is configured to match the first groove so as to enable the support member to be installed on the hub.

For example, in the omnidirectional wheel provided by an embodiment of the present disclosure, a distance between the two side mounting surfaces of at least one first groove of the first grooves gradually decreases along a direction from an opening of the first groove to a corresponding bottom mounting surface, or the two side mounting surfaces of at least one first groove of the first grooves are perpendicular to a corresponding bottom mounting surface; and a distance between the two base side surfaces of at least one first base portion gradually decreases in a direction gradually approaching a corresponding base bottom surface, or the two base side surfaces of at least one first base portion are perpendicular to a corresponding base bottom surface.

For example, in the omnidirectional wheel provided by an embodiment of the present disclosure, the two side mounting surfaces of at least one first groove of the first grooves are not perpendicular to a corresponding bottom mounting surface, and angles respectively between the two side mounting surfaces and the corresponding bottom mounting surface are different; and the two base side surfaces of at least one first base portion are not perpendicular to a corresponding base bottom surface, and angles respectively between the two base side surfaces and the corresponding base bottom surface are different.

For example, in the omnidirectional wheel provided by an embodiment of the present disclosure, the first base portion is provided with a threaded hole, and an axis of the threaded hole points to the wheel center of the hub.

For example, in the omnidirectional wheel provided by an embodiment of the present disclosure, a bottom of the first groove is provided with a through hole, and in the case where the first base portion of the support member is inserted into the first groove, the through hole is concentric with a corresponding threaded hole on the first base portion.

For example, in the omnidirectional wheel provided by an embodiment of the present disclosure, the plurality of support members are divided into a plurality of groups, each group of the plurality of groups comprises at least two support members, support members in a same group are integrally formed on a same second base portion, and support members in different groups are formed on different second base portions, the hub is provided with a plurality of second grooves, the plurality of second grooves are disposed at intervals along a circumferential direction of a distribution circumference of the plurality of support members, the plurality of second grooves are disposed in one-to-one correspondence with the plurality of groups of support members, and each of the second grooves is configured to provide an installation space for the second base portion so as to enable a corresponding group of support members to be installed on the hub.

For example, in the omnidirectional wheel provided by an embodiment of the present disclosure, a length of the first mounting shaft is less than a length of the second mounting shaft.

For example, in the omnidirectional wheel provided by an embodiment of the present disclosure, the hub comprises a flange plate, a hub main body, and a plurality of reinforcing ribs, a center of the flange plate and the wheel center of the hub are both on an axis of the hub, the hub main body surrounds the flange plate, the hub main body comprises two sides distributed along the axis of the hub, and the flange plate is on one side of the two sides of the hub main body, the plurality of reinforcing ribs are distributed at intervals along a circumferential direction of the hub, the reinforcing ribs are in the hub main body and on a side of the flange plate, and the reinforcing ribs extend from an inner wall of the hub main body to the flange plate.

For example, in the omnidirectional wheel provided by an embodiment of the present disclosure, the hub comprises a hub main body and an axle, the axle is on an axis of the hub, and the axle and the hub main body are an integral structure.

For example, in the omnidirectional wheel provided by an embodiment of the present disclosure, one of the first mounting surface and the second mounting surface of each of the support members is a curved surface and another one of the first mounting surface and the second mounting surface of each of the support members is a flat surface; or the first mounting surface and the second mounting surface of each of the support members are both curved surfaces or flat surfaces, and for a same support member, the first mounting surface and the second mounting surface are symmetrical.

At least one embodiment of the present disclosure provides an omnidirectional wheel, and the omnidirectional wheel comprises a hub, a plurality of support members, a plurality of first rollers, and a plurality of second rollers. The plurality of support members are circumferentially distributed on the hub, each of the support members has a first mounting surface and a second mounting surface disposed oppositely, the first mounting surface is provided with a first mounting shaft, the second mounting surface is provided with a second mounting shaft, and a distance between a first axis of the first mounting shaft and a wheel center of the hub is less than a distance between a second axis of the second mounting shaft and the wheel center of the hub. At least one first roller of the first rollers is rotatably disposed on each first mounting shaft; and at least one second roller of the second rollers is rotatably disposed on each second mounting shaft. Along a circumferential direction of a distribution circumference of the plurality of support members, the plurality of first rollers and the plurality of second rollers are disposed at intervals in sequence, one of the second rollers is between two adjacent first rollers, and one of the first rollers is between two adjacent second rollers. Each of the first rollers has a first large diameter end and a first small diameter end, a diameter of the first large diameter end is larger than a diameter of the first small diameter end, and the first small diameter end has an accommodating hole, each of the second rollers has a second large diameter end and a second small diameter end, a diameter of the second large diameter end is larger than a diameter of the second small diameter end, and the second small diameter end of each of the second rollers is at least partially embedded in the accommodating hole of the first small diameter end of an adjacent first roller. The diameter of the first small diameter end of each of the first rollers is larger than the diameter of the second large diameter end of each of the second rollers. For a same support member, the first axis of the first mounting shaft is parallel to the second axis of the second mounting shaft. The hub is provided with a plurality of first grooves, the plurality of first grooves are disposed at intervals along a circumferential direction of a distribution circumference of the plurality of support members, the plurality of first grooves are disposed in one-to-one correspondence with the plurality of support members, each first groove of the first grooves comprises a bottom mounting surface and two side mounting surfaces, the two side mounting surfaces are disposed at intervals along the circumferential direction of the distribution circumference, and each of the first grooves is configured to provide an installation space for a support member corresponding to the first groove, so as to enable the support member to be installed on the hub. The support member comprises a first base portion that is matched with the first groove, the first base portion comprises a base bottom surface and two base side surfaces on both sides of the base bottom surface, and the first base portion is configured to match the first groove so as to enable the support member to be installed on the hub; the first base portion is provided with a threaded hole, and an axis of the threaded hole points to the wheel center of the hub; a bottom of the first groove is provided with a through hole, and in the case where the first base portion of the support member is inserted into the first groove, the through hole is concentric with a corresponding threaded hole on the first base portion; and a length of the first mounting shaft is less than a length of the second mounting shaft.

At least one embodiment of the present disclosure provides a scooter, and the scooter comprises a seat and at least one omnidirectional wheel. The omnidirectional wheel is rotatably disposed on at least one side of the seat, and the omnidirectional wheel is the omnidirectional wheel provided by any one of embodiments of the present disclosure.

BRIEF DESCRIPTION OF THE DRAWINGS

In order to clearly illustrate the technical solution of the embodiments of the present disclosure, the drawings of the embodiments will be briefly described in the following. It is obvious that the described drawings in the following are only related to some embodiments of the present disclosure, and for those of ordinary skill in the art, other drawings can be obtained based on these drawings.

DETAILED DESCRIPTION

Figure 1:
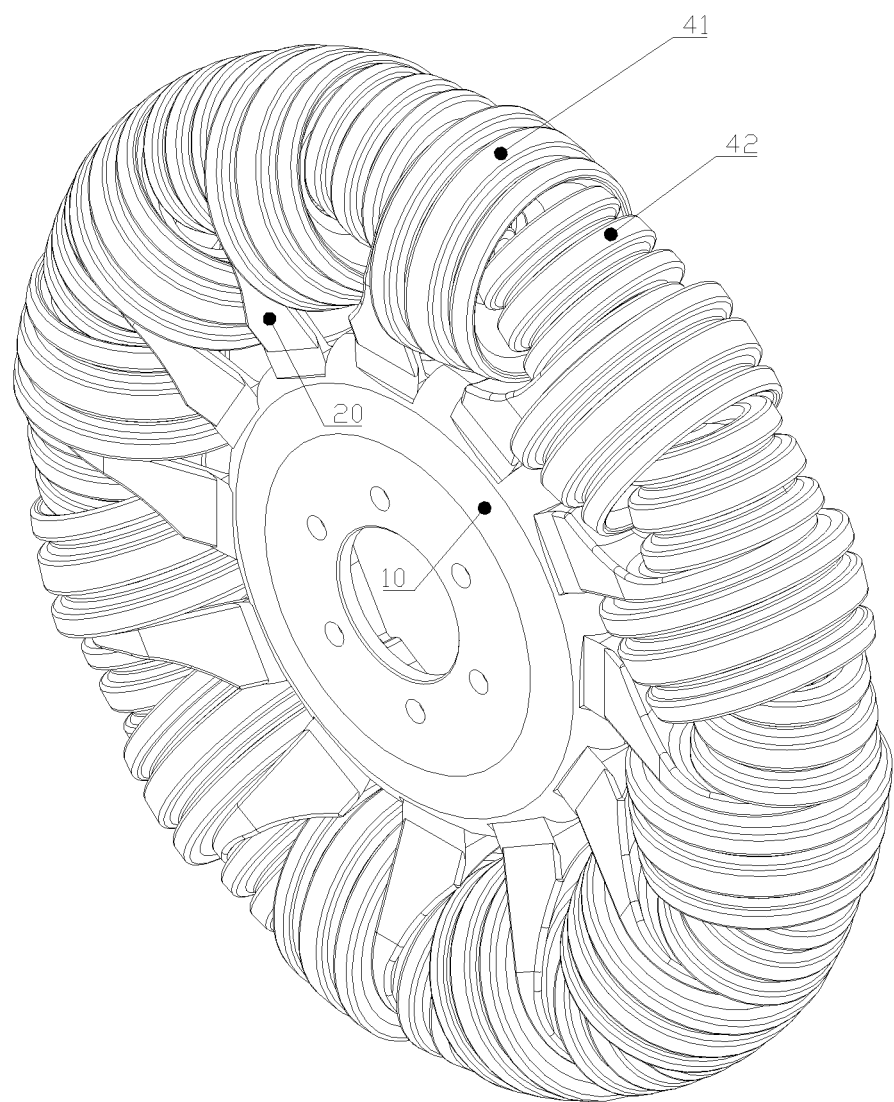
FIG. 1 is a three-dimensional structure diagram of an omnidirectional wheel provided by an embodiment of the present disclosure from a first view angle.
Figure 2:
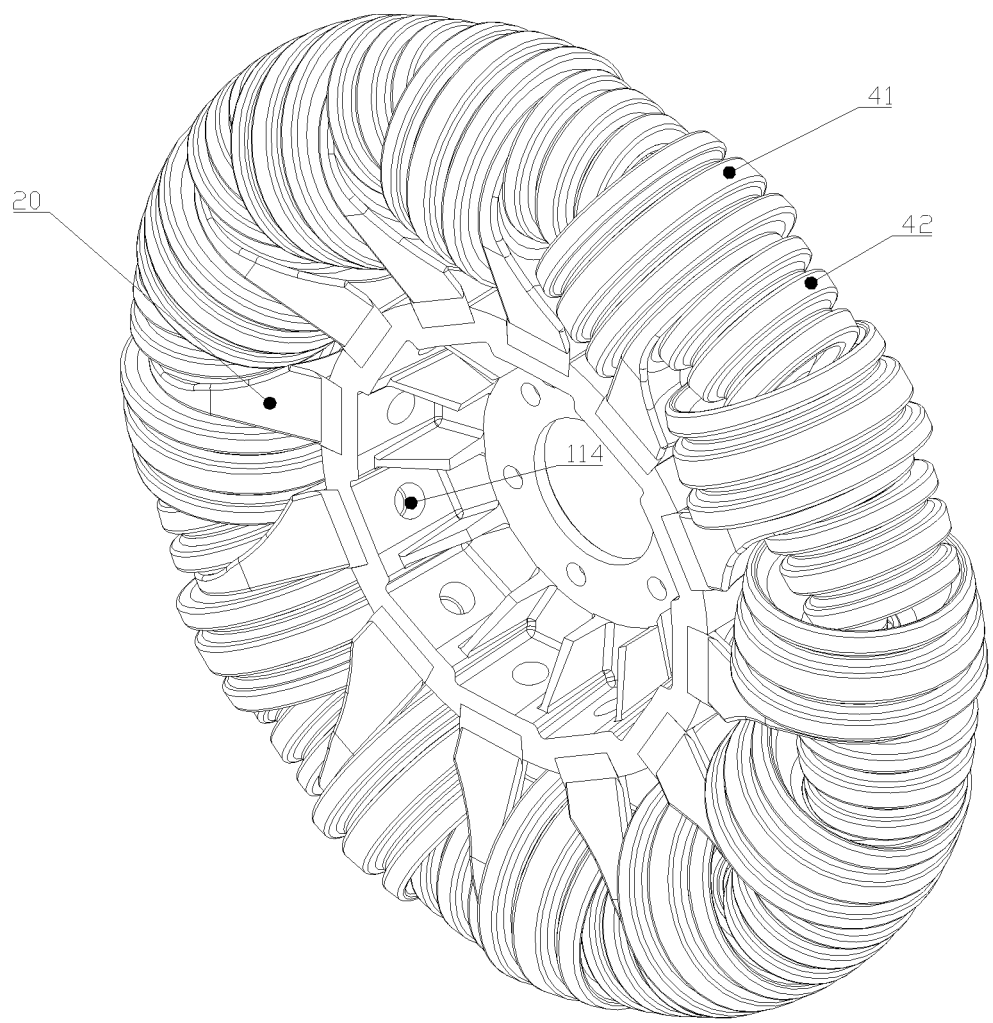
FIG. 2 is a three-dimensional structure diagram of an omnidirectional wheel provided by an embodiment of the present disclosure from a second view angle.
Figure 3:
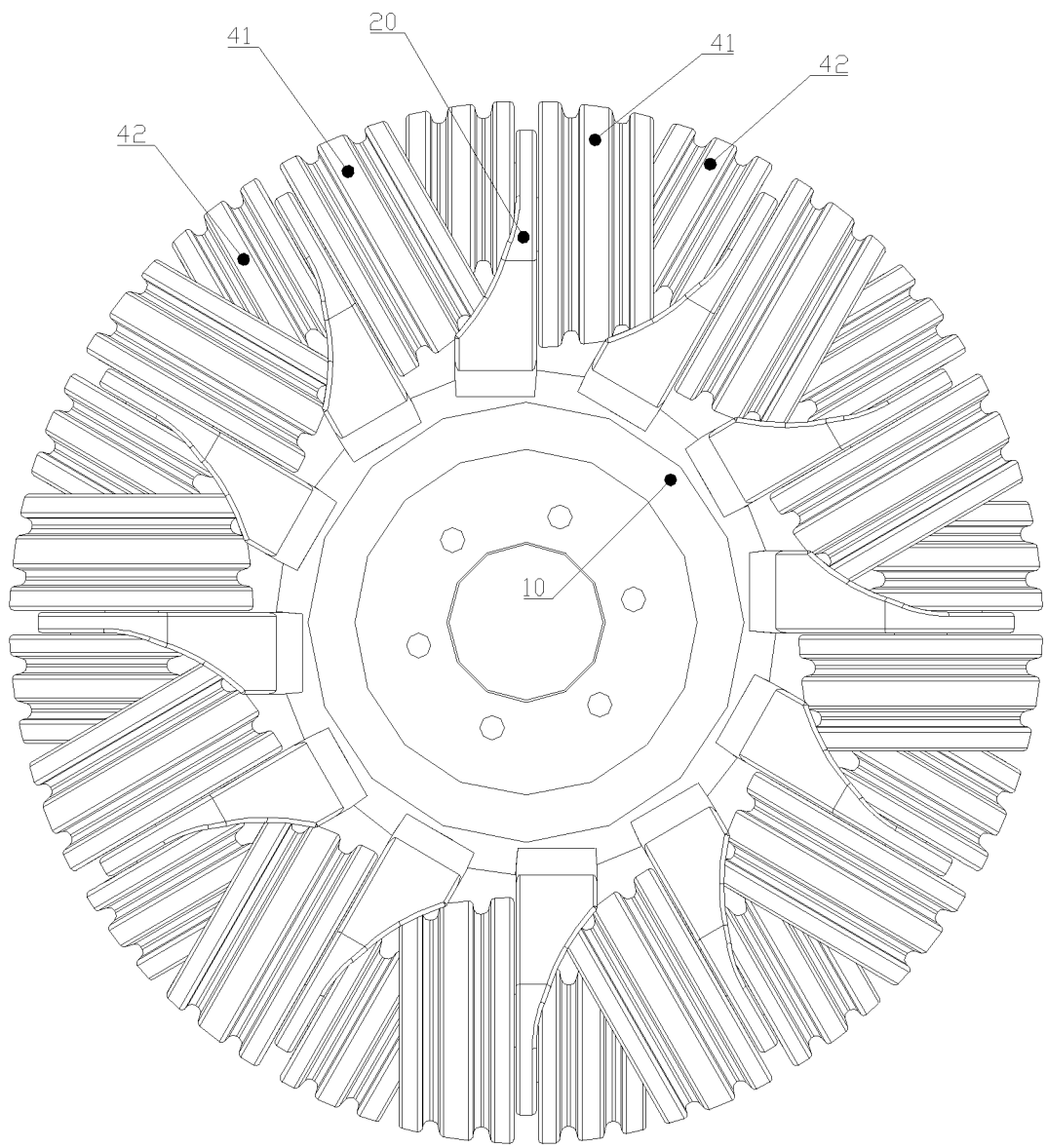
FIG. 3 is a schematic diagram of a front structure of an omnidirectional wheel provided by an embodiment of the present disclosure.
Figure 4:
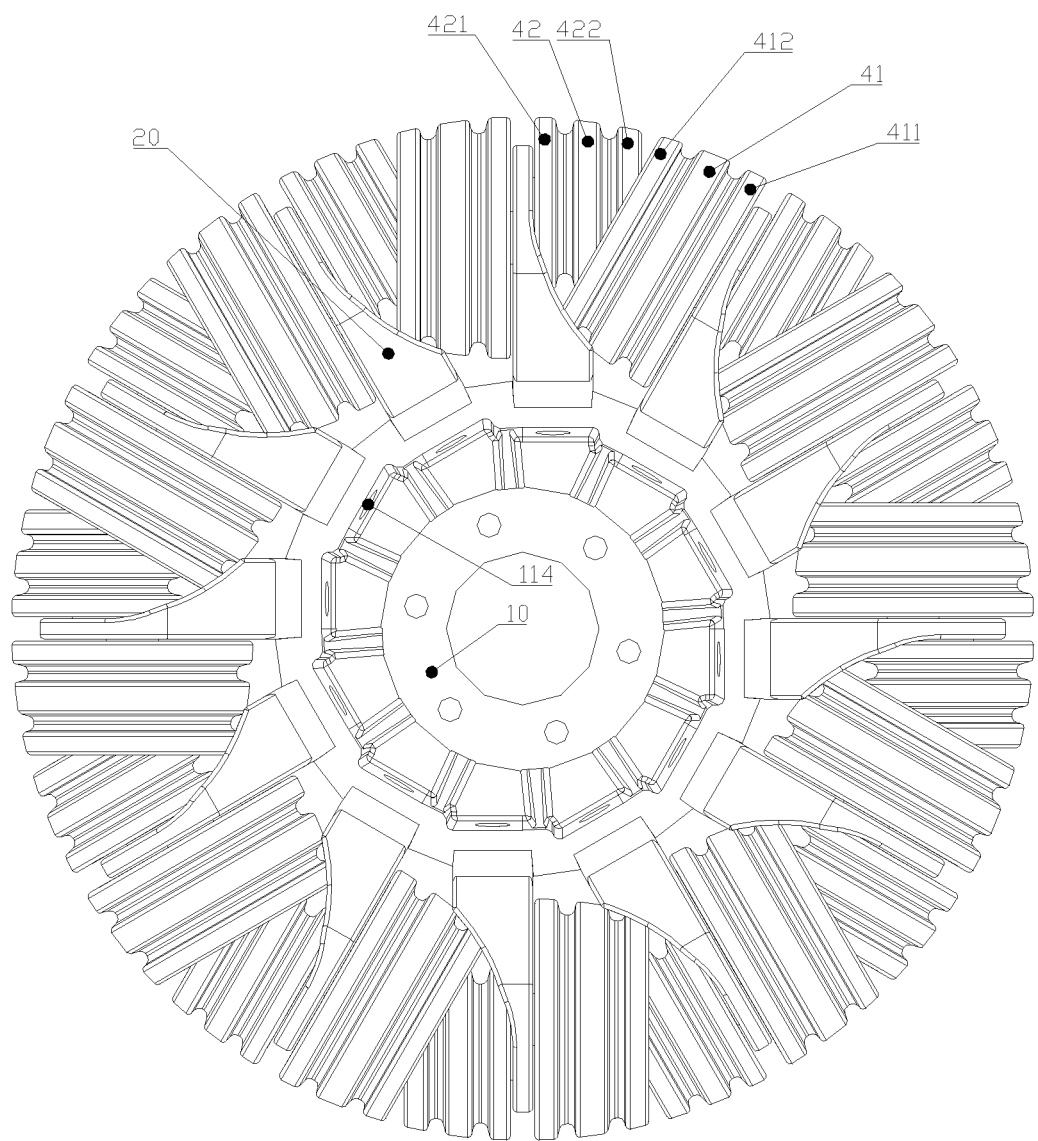
FIG. 4 is a schematic diagram of a front structure of an omnidirectional wheel with the hub cover plate removed provided by an embodiment of the present disclosure.
Figure 5A:
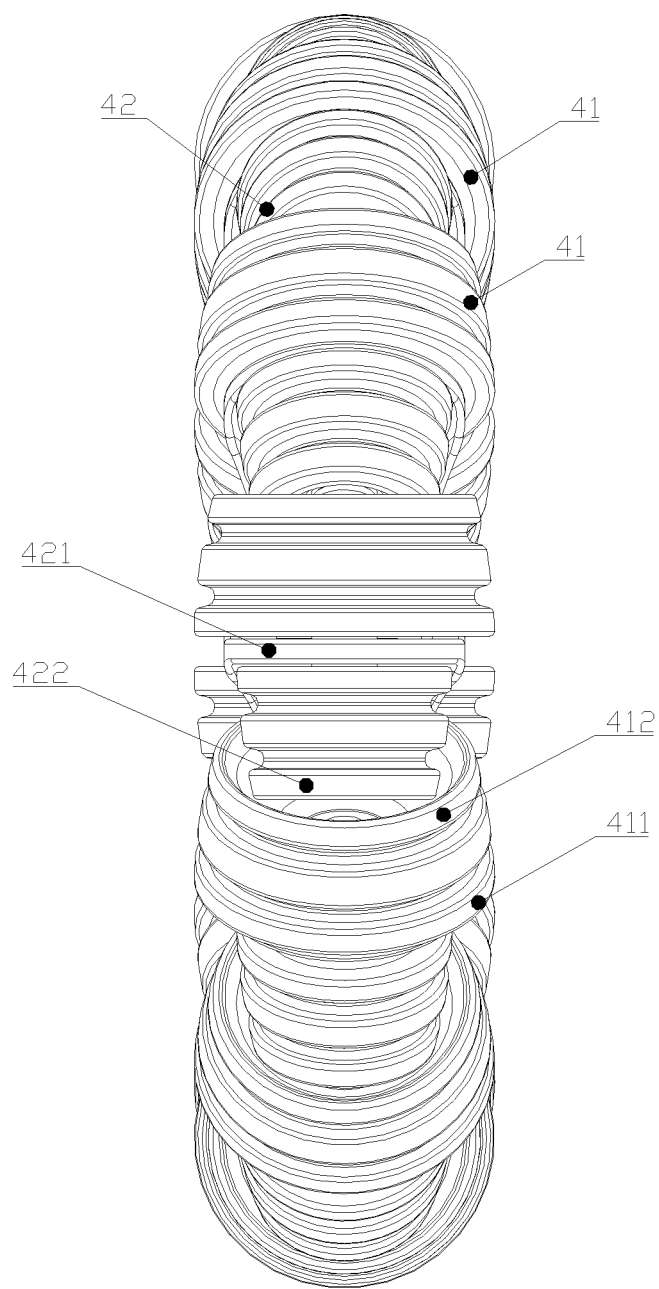
FIG. 5A is a schematic diagram of a left side structure of an omnidirectional wheel provided by an embodiment of the present disclosure.
Figure 5B:
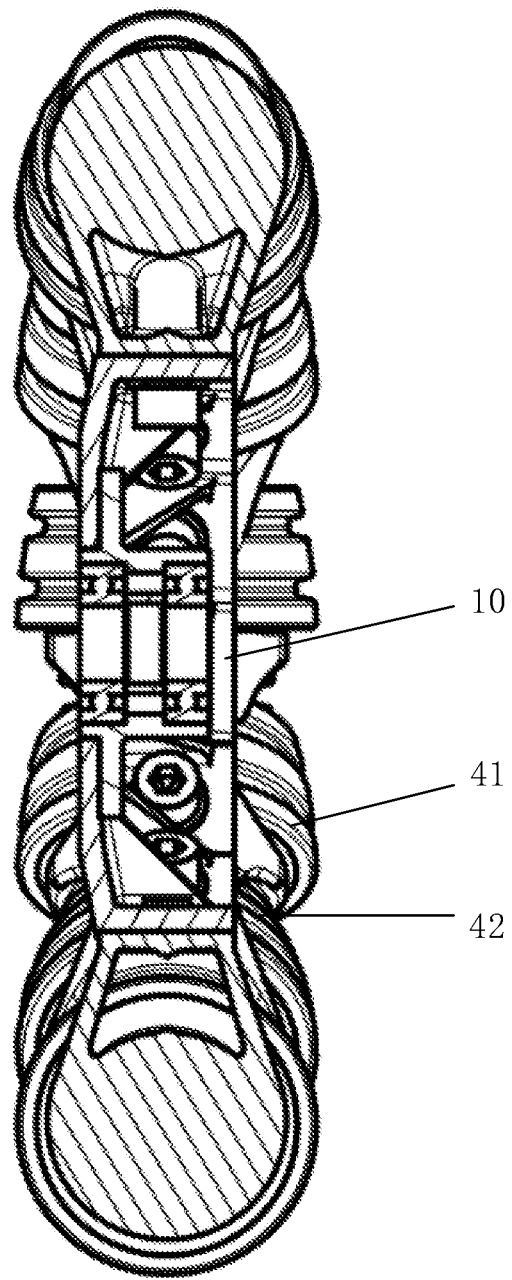
FIG. 5B is a cross-sectional diagram of a left side structure of an omnidirectional wheel provided by an embodiment of the present disclosure.

In order to make objects, technical details and advantages of the embodiments of the disclosure apparent, the technical solutions of the embodiments will be described in a clearly and fully understandable way in connection with the drawings related to the embodiments of the disclosure. Apparently, the described embodiments are just a part but not all of the embodiments of the disclosure. Based on the described embodiments herein, those skilled in the art can obtain other embodiment(s), without any inventive work, which should be within the scope of the disclosure.

Unless otherwise defined, all the technical and scientific terms used herein have the same meanings as commonly understood by one of ordinary skill in the art to which the present disclosure belongs. The terms "first," "second," etc., which are used in the description and the claims of the present application for disclosure, are not intended to indicate any sequence, amount or importance, but distinguish various components. Also, the terms "comprise," "comprising," "include," "including," etc., are intended to specify that the elements or the objects stated before these terms encompass the elements or the objects and equivalents thereof listed after these terms, but do not preclude the other elements or objects. The phrases "connect", "connected", "coupled", etc., are not intended to define a physical connection or mechanical connection, but may include an electrical connection, directly or indirectly. "On," "under," "right," "left" and the like are only used to indicate relative position relationship, and when the position of the object which is described is changed, the relative position relationship may be changed accordingly.

Of course, implementing any technical solution of the embodiments of the present disclosure does not necessarily need to achieve all the advantages of the embodiments of the present disclosure at the same time.

Scooters usually adopt omnidirectional wheels to move, for example, to move forward, move backward, and move sideways. However, the general omnidirectional wheels have some problems. For example, the structure of the omnidirectional wheel is relatively complicated, which leads to high production cost, difficult installation, low installation efficiency, difficult maintenance, low maintenance efficiency, and high maintenance cost, which make the production and maintenance of the omnidirectional wheels and the scooters adopting the omnidirectional wheels difficult. It is not conducive to improve production efficiency and maintenance efficiency, and it is not conducive to reduce costs.

At least one embodiment of the present disclosure provides an omnidirectional wheel and a scooter having an omnidirectional wheel. The omnidirectional wheel has a simple structure, and can lower the difficulty of installation and maintenance, improve the efficiency of installation and maintenance, and reduce the production cost and maintenance cost.

The specific implementations of the embodiments of the present disclosure are further described below in conjunction with the accompanying drawings of the embodiments of the present disclosure.

As illustrated in FIGS. 1-5B and FIG. 8, an embodiment of the present disclosure provides an omnidirectional wheel, and the omnidirectional wheel includes a hub 10, a plurality of support members 20, a plurality of first rollers 41, and a plurality of second rollers 42.

For example, the plurality of support members 20 are circumferentially distributed on the hub 10, and each support member 20 has a first mounting surface 21 and a second mounting surface 22 disposed oppositely, the first mounting surface 21 is provided with a first mounting shaft 31, and the second mounting surface 22 is provided with a second mounting shaft 32. A distance between a first axis of the first mounting shaft 31 and a wheel center of the hub 10 is less than a distance between a second axis of the second mounting shaft 32 and the wheel center of the hub 10. At least one first roller 41 is rotatably disposed on each first mounting shaft 31, and at least one second roller 42 is rotatably disposed on each second mounting shaft 32.

The hub 10 of the omnidirectional wheel is used to install the support members 20, the first rollers 41, the second rollers 42, and the like. For example, the hub 10 may be made of aluminum alloy, zinc alloy, magnesium alloy or other suitable materials, and for example, may be manufactured by any suitable manufacturing method such as casting process, turning and milling process, and the like.

The support members 20 are used to install the first rollers 41 and the second rollers 42. Because there are a plurality of support members 20 and the plurality of support members 20 are distributed circumferentially on the hub 10, the first rollers 41 and the second rollers 42 can be distributed evenly in the circumferential direction of the hub 10. For example, in some examples, one first roller 41 and one second roller 42 are installed on each support member 20, and the plurality of support members 20 are sequentially installed on the hub 10, so that the first rollers 41 and the second rollers 42 are alternately distributed along the circumference of the hub 10 and the distance between each other is relatively uniform, so the omnidirectional wheel has a uniform and flat working surface to achieve smooth movement. For example, the support members 20 may be made of aluminum alloy, zinc alloy, magnesium alloy or other suitable materials, and for example, may be manufactured by any suitable manufacturing method such as casting process, turning and milling process, and the like.

For example, in some examples, the number of the plurality of support members 20 is 12, and the 12 support members 20 are evenly distributed along the circumference of the hub 10. It should be noted that, in the embodiments of the present disclosure, the number of support members 20 is not limited, and may be 12, or any applicable value such as 8, 16, 20, etc., which can be determined according to actual needs.

For example, the distance between the first axis of the first mounting shaft 31 and the wheel center of the hub 10 is less than the distance between the second axis of the second mounting shaft 32 and the wheel center of the hub 10, that is, the first axis of the first mounting shaft 31 and the second axis of the second mounting shaft 32 are different, so that the hub 10 can adapt to rollers of different diameters, that is, the first roller 41 and the second roller 42 of different diameters can be installed on the same support member 20. In this way, the first roller 41 and the second roller 42 can rotate under the drive of the hub 10, and can also rotate relative to the hub 10, so as to realize forward movement or backward movement, and also realize lateral movement, so that omnidirectional movement can be achieved.

For example, the first roller 41 may be connected to the first mounting shaft 31 through a bearing, so that the first roller 41 can rotate around the first mounting shaft 31. For example, the second roller 42 may be connected to the second mounting shaft 32 through a bearing, so that the second roller 42 can rotate around the second mounting shaft 32. For example, the portions of the first roller 41 and the second roller 42 matched with the bearings may be made of materials such as aluminum alloy, nylon, or the like. The outer contour portions of the first roller 41 and the second roller 42 (that is, the portions for contact with the ground) may be made of thermoplastic rubber or vulcanized rubber. It should be noted that the materials of the first roller 41 and the second roller 42 are not limited to the materials listed above, and any applicable materials can be used, which can be determined according to actual requirements, and the embodiments of the present disclosure are not limited in this aspect.

For example, as illustrated in FIG. 1 to FIG. 4, in some examples, the plurality of first rollers 41 and the plurality of second rollers 42 are disposed at intervals in sequence along the circumferential direction of the distribution circumference of the plurality of support members 20, one second roller 42 is between two adjacent first rollers 41, and one first roller 41 is between two adjacent second rollers 42. In this way, the first rollers 41 and the second rollers 42 can be alternately distributed along the circumference of the hub 10 and the distance between each other is relatively uniform, so that the omnidirectional wheel has a uniform and flat working surface to achieve smooth movement.

As illustrated in FIG. 6A, FIG. 6B, FIG. 7A and FIG. 7B, in some examples, a plurality of first grooves 11 are provided on the hub 10, and the plurality of first grooves 11 are disposed at intervals along the circumferential direction of the distribution circumference of the plurality of support members 20. The first grooves 11 are disposed in one-to-one correspondence with the support members 20. Each first groove 11 includes a bottom mounting surface 111 and two side mounting surfaces 112, and the two side mounting surfaces 112 are disposed at intervals along the circumferential direction of the distribution circumference. The first groove 11 is configured to provide an installation space for the support member 20, so as to enable the support member 20 to be installed on the hub 10. For example, the number of the first grooves 11 is equal to the number of the support members 20.

In a feasible manner, the distance between the two side mounting surfaces 112 of at least one first groove 11 gradually decreases along the direction from the opening of the first groove 11 to the corresponding bottom mounting surface 111. In this way, the two side mounting surfaces 112 of the first groove 11 are inclined surfaces, and the area of the opening of the first groove 11 is larger than the area of the bottom mounting surface 111, so that the support member 20 can be positioned and guided, which make the installation of the support member 20 more convenient.

In another feasible manner, the two side mounting surfaces 112 of at least one first groove 11 are perpendicular to the corresponding bottom mounting surface 111. In this way, the processing becomes more convenient, the production costs can be reduced, and the reliable positioning of the support member 20 can be ensured.

Figure 7A:
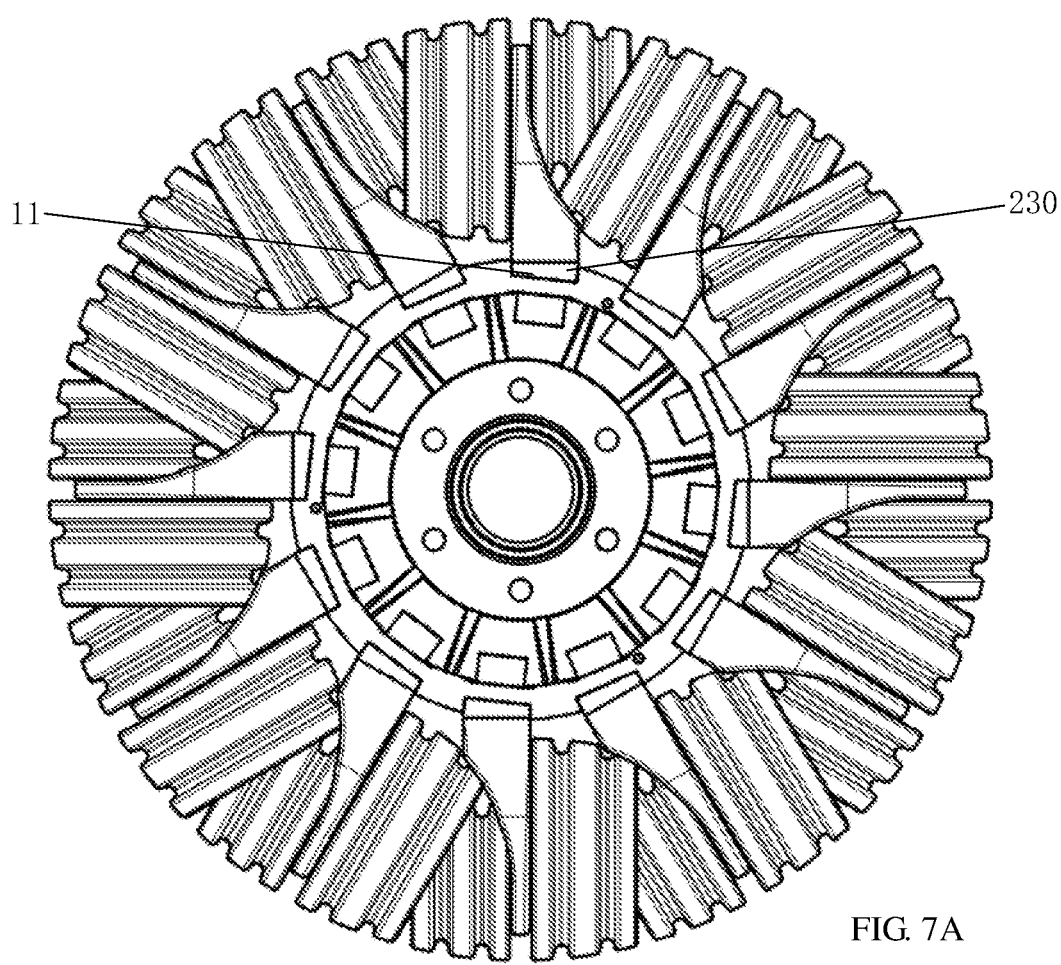
FIGS. 7A-7B are other three-dimensional structure diagrams of a hub matched with one of support members provided by an embodiment of the present disclosure.
Figure 7B:
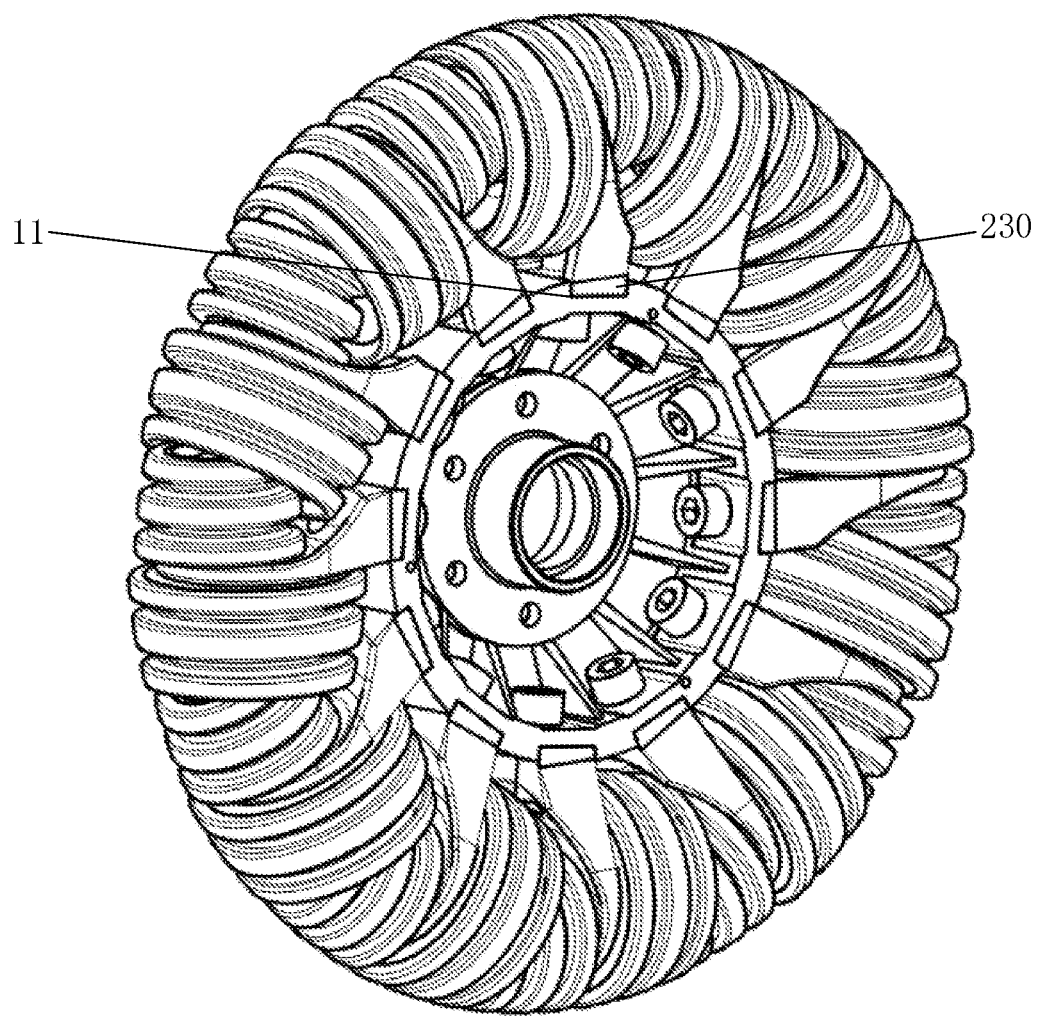

In still another feasible manner, as illustrated in FIG. 7A and FIG. 7B, the two side mounting surfaces 112 of at least one first groove 11 are not perpendicular to the corresponding bottom mounting surface 111, and angles respectively between the two side mounting surfaces 112 and the corresponding bottom mounting surface 111 are different, that is, the cross-sectional shape of the first groove 11 is an asymmetric trapezoid. In this way, the fastener used to install the support member 20 can point to the wheel center of the hub 10, so that when the omnidirectional wheel is used in a scooter, the omnidirectional wheel used as the left wheel and the omnidirectional wheel used as the right wheel no longer need to be distinguished, and the left wheel and the right wheel are identical, so as to reduce the number of molds, and there is no need to deliberately prevent the left wheel and right wheel from being reversed.

In still another feasible manner, the two side mounting surfaces 112 of at least one first groove 11 are parallel to each other and are not perpendicular to the corresponding bottom mounting surface 111, that is, the two side mounting surfaces 112 are inclined along the same direction. Because the first roller 41 and the second roller 42 are installed on the support member 20, and size of the first roller 41 is different from size of the second roller 42, in order to allow the first rollers 41 and the second rollers 42 to be disposed alternately along the circumference of the hub 10, it is necessary to install the plurality of support members 20 in the first grooves 11 in the same direction. The two side mounting surfaces 112 of the first groove 11 are inclined in the same direction, which can ensure that the support member 20 can only be inserted into the first groove 11 in the preset direction without manually determining the installation direction, thereby avoiding installation errors and improving installation efficiency, so that the plurality of first rollers 41 and the plurality of second rollers 42 are alternately distributed in sequence after the installation is completed.

For example, in order to facilitate manufacturing and provide better support for the support member 20, the bottom mounting surface 111 is a flat surface.

Figure 6A:
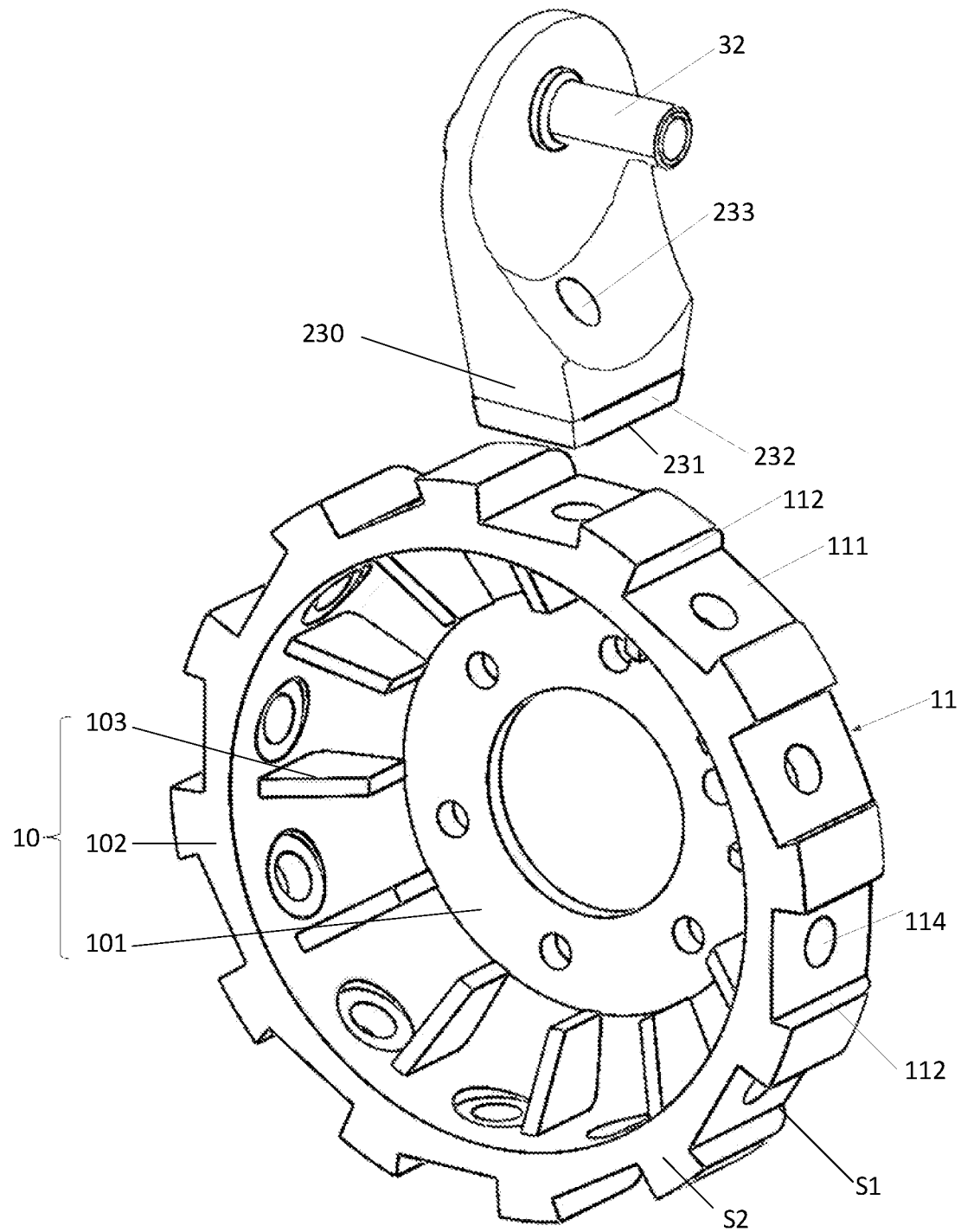
FIG. 6A is a three-dimensional structure diagram of a hub matched with one of support members provided by an embodiment of the present disclosure.
Figure 6B:
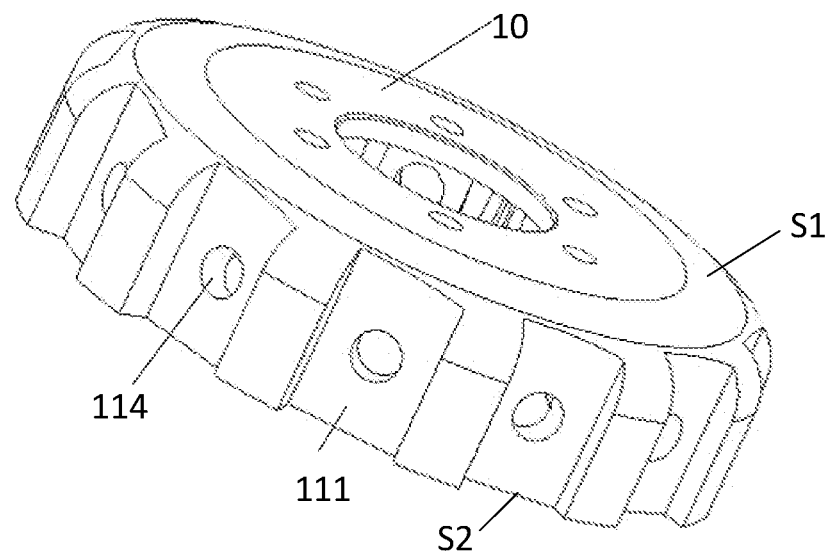
FIG. 6B is a three-dimensional structure diagram of a hub provided by an embodiment of the present disclosure.

For example, as illustrated in FIG. 6A and FIG. 6B, in some examples, the hub 10 includes a flange plate 101, a hub main body 102 and a plurality of reinforcing ribs 103. The center of the flange plate 101 and the wheel center of the hub 10 are both located on the axis (for example, the rotation axis) of the hub 10. The hub main body 102 surrounds the flange plate 101. The hub main body 102 includes two sides (such as a first side S1 and a second side S2) distributed along the axis of the hub 10. The flange plate 101 is located on one side of the two sides (for example on the first side S1) of the hub main body 102. The plurality of reinforcing ribs 103 are distributed at intervals along the circumferential direction of the hub 10. The reinforcing ribs 103 are located in the hub main body 102 and on a side of the flange plate 101, and the reinforcing ribs 103 extend from the inner wall of the hub main body 102 to the flange plate 101. By locating the flange plate 101 on one side of the hub main body 102 (for example, the first side S1), a space can be reserved for the reinforcing ribs 103 so as to improve the strength of the hub 10, and an operation space can also be reserved for installing the support member 20. The flange plate 101 has a through hole to facilitate the installation of a roller, so that the omnidirectional wheel can be installed on a scooter or other equipment.

For example, the hub 10 is also provided with an axis hole (for example, the through hole of the flange plate 101 mentioned above) for mounting a roller, and the axis of the axis hole is the rotation axis of the hub 10. The wheel center of the hub 10 may be the center of mass of the hub 10, or an appropriate point on the rotation axis of the hub 10 serves as the wheel center.

For example, in some examples, in order to match the hub 10, the support member 20 includes a first base portion 230 that is matched with the first groove 11. The first base portion 230 includes a base bottom surface 231 and two base side surfaces 232 located on both sides of the base bottom surface 231. The first base portion 230 is configured to match the first groove 11 so as to enable the support member 20 to be installed on the hub 10.

In a feasible manner, the distance between the two base side surfaces 232 of at least one first base portion 230 gradually decreases in a direction gradually approaching the corresponding base bottom surface 231. In this way, the first base portion 230 has a taper, so that the first base portion 230 can be easily inserted into the first groove 11 and can be restricted by the base side surfaces 232 and the side mounting surfaces 112. This tapered structure also helps center the support member 20 (that is, the two base side surfaces 232 point to the wheel center of the hub 10). In this case, the distance between the two side mounting surfaces 112 of the first groove 11 gradually decreases along the direction from the opening of the first groove 11 to the corresponding bottom mounting surface 111, so as to cooperate with the first base portion 230.

In another feasible manner, the two base side surfaces 232 of at least one first base portion 230 are perpendicular to the corresponding base bottom surface 231. The first base portion 230 of this structure can fit the first groove 11 in which the side mounting surfaces 112 are perpendicular to the bottom mounting surface 111, so as to ensure stable installation, and the manufacturing and production can be more convenient, which can effectively reduce costs. In this case, the two side mounting surfaces 112 of the first groove 11 are perpendicular to the corresponding bottom mounting surface 111 to cooperate with the first base portion 230.

In still another feasible manner, as illustrated in FIG. 7A and FIG. 7B, the two base side surfaces 232 of at least one first base portion 230 are not perpendicular to the corresponding base bottom surface 231, and angles respectively between the two base side surfaces 232 and the corresponding base bottom surface 231 are different, that is, the cross-sectional shape of the first base portion 230 is an asymmetrical trapezoid. In this way, the fastener used to install the support member 20 can point to the wheel center of the hub 10, so that when the omnidirectional wheel is used in a scooter, the omnidirectional wheel used as the left wheel and the omnidirectional wheel used as the right wheel no longer need to be distinguished, and the left wheel and the right wheel are identical, so as to reduce the number of molds, and there is no need to deliberately prevent the left wheel and right wheel from being reversed. In this case, the two side mounting surfaces 112 of the first groove 11 are not perpendicular to the corresponding bottom mounting surface 111, and angles respectively between the two side mounting surfaces 112 and the corresponding bottom mounting surface 111 are different, so as to cooperate with the first base portion 230.

In another feasible manner, the two base side surfaces 232 of at least one first base portion 230 are parallel to each other and are not perpendicular to the corresponding base bottom surface 231, that is, the two base side surfaces 232 are inclined along the same direction. This manner can ensure that the support member 20 can only be inserted into the first groove 11 in the preset direction without manually determining the installation direction, thereby avoiding installation errors and improving installation efficiency, so that after the installation is completed, the first rollers 41 and the second rollers 42 are alternately distributed in sequence. In this case, the two side mounting surfaces 112 of the first groove 11 are parallel to each other and both are not perpendicular to the corresponding bottom mounting surface 111, so as to cooperate with the first base portion 230.

For example, in order to enable the support member 20 to be reliably fixed on the hub 10, the first base portion 230 is provided with a threaded hole 233, and the axis of the threaded hole 233 points to the wheel center of the hub 10. In this way, the support member 20 can be fixed to the hub 10 by a fastener with threads (such as bolts, screws, etc.).

For example, the bottom of the first groove 11 is provided with a through hole 114. In the case where the first base portion 230 of the support member 20 is inserted into the first groove 11, the through hole 114 is concentric with the threaded hole 233 on the corresponding first base portion 230. The through hole 114 is aligned with the threaded hole 233 on the corresponding support member 20, so that a fastener with threads can pass through the through hole 114 from the inside of the hub 10 and cooperate with the threaded hole 233, thereby locking the support member 20.

Figure 8:
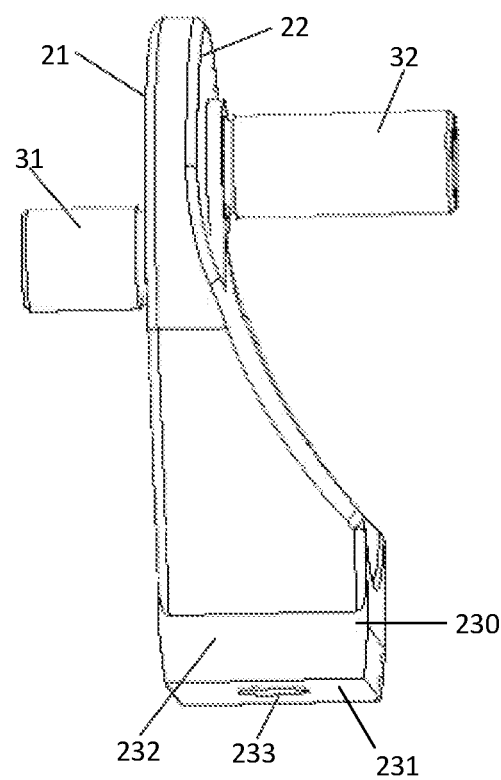
FIG. 8 is a three-dimensional structure diagram of a support member provided by an embodiment of the present disclosure.

As illustrated in FIG. 8, in addition to the first base portion 230, the support member 20 further includes a support portion for installing the first mounting shaft 31 and the second mounting shaft 32. The first base portion 230 and the support portion are integrally formed. The first base portion 230 is used to cooperate with the first groove 11 of the hub 10, and the support portion is used for installing the first mounting shaft 31 and the second mounting shaft 32.

For example, in some examples, as illustrated in FIG. 8, the first mounting surface 21 of the support member 20 is a flat surface and the second mounting surface 22 of the support member 20 is a curved surface. The first mounting surface 21 and the second mounting surface 22 form an asymmetric structure. By making the first mounting surface 21 and the second mounting surface 22 different, the respective mounting positions of the first roller 41 and the second roller 42 can be easily identified, thereby preventing installation errors and improving installation efficiency.

For example, after the support member 20 is installed on the hub 10, the first mounting surface 21 of the support member 20 points to the wheel center of the hub 10.

For example, in some examples, as illustrated in FIG. 8, for the same support member 20, the first axis of the first mounting shaft 31 and the second axis of the second mounting shaft 32 are parallel to each other. For example, the plane composed by the first axis and the second axis is perpendicular to the rotation axis of the hub 10. That is, the first axis and the second axis are located in the same plane, which is perpendicular to the rotation axis of the hub 10, and the plane is, for example, parallel to the plate surface of the flange plate 101. In this plane, there is a first distance between the first axis and the second axis. In other words, the distance between the first axis and the wheel center of the hub 10 (denoted as the second distance) is less than the distance between the second axis and the wheel center of the hub 10 (denoted as the third distance), so that after the first roller 41 is installed on the first mounting shaft 31 and the second roller 42 is installed on the second mounting shaft 32, the first roller 41 can rotate around the first mounting shaft 31 and the second roller 42 can rotate around the second mounting shaft 32, respectively, and the rotation axis (that is, the first axis) of the first roller 41 is parallel to the tangent line of the outer circumference of the hub 10 at the connection position with the corresponding support member 20, and the rotation axis (that is, the second axis) of the second roller 42 is parallel to the tangent line of the outer circumference of the hub 10 at the connection position with the corresponding support member 20, thereby realizing the lateral rotation of the first roller 41 and the second roller 42.

For example, the length of the first mounting shaft 31 is less than the length of the second mounting shaft 32. In this way, while ensuring the support for the first roller 41 and the second roller 42, the second mounting shaft 32 can avoid conflict.

Figure 9A:
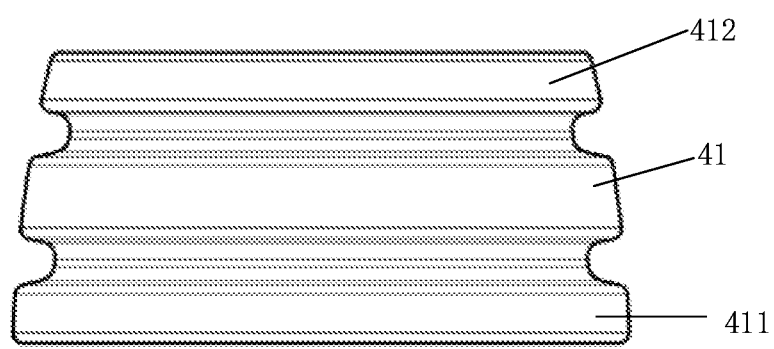
FIG. 9A is a front diagram of a first roller in an omnidirectional wheel provided by an embodiment of the present disclosure.
Figure 9B:
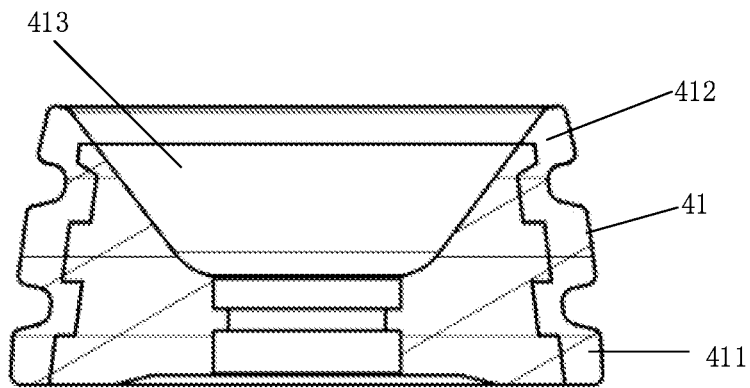
FIG. 9B is a cross-sectional diagram of a first roller in an omnidirectional wheel provided by an embodiment of the present disclosure.
Figure 10A:
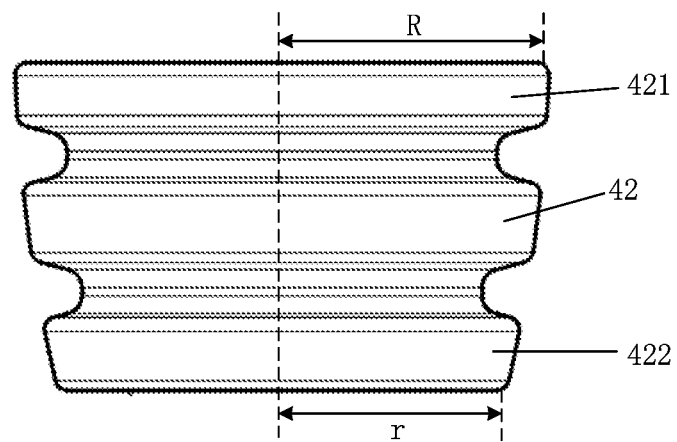
FIG. 10A is a front diagram of a second roller in an omnidirectional wheel provided by an embodiment of the present disclosure.
Figure 10B:
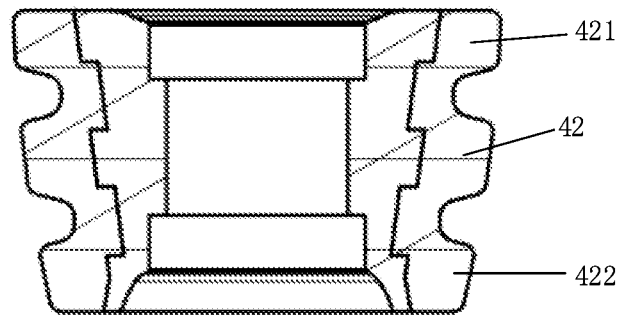
FIG. 10B is a cross-sectional diagram of a second roller in an omnidirectional wheel provided by an embodiment of the present disclosure.

FIG. 9A is a front diagram of a first roller in an omnidirectional wheel provided by an embodiment of the present disclosure; FIG. 9B is a cross-sectional diagram of a first roller in an omnidirectional wheel provided by an embodiment of the present disclosure; FIG. 10A is a front diagram of a second roller in an omnidirectional wheel provided by an embodiment of the present disclosure; and FIG. 10B is a cross-sectional diagram of a second roller in an omnidirectional wheel provided by an embodiment of the present disclosure.

As illustrated in FIG. 4, FIG. 9A to FIG. 10B, in order to avoid interference, the first roller 41 has a first large diameter end 411 and a first small diameter end 412, and the diameter of the first large diameter end 411 is larger than the diameter of the first small diameter end 412. The second roller 42 has a second large diameter end 421 and a second small diameter end 422, and the diameter of the second large diameter end 421 is larger than the diameter of the second small diameter end 422. The first small diameter end 412 of the first roller 41 has an accommodating hole 413, and the second small diameter end 422 of the second roller 42 is at least partially embedded in the accommodating hole 413 of the first small diameter end 412 of the adjacent first roller 41. In this way, at least part of the second roller 42 can be embedded in the first roller 41, thereby preventing interference between the first roller 41 and the second roller 42 and ensuring that the first roller 41 and the second roller 42 can rotate relatively.

In the omnidirectional wheel, the rollers with different diameters are alternately disposed in a ring (that is, the first rollers 41 and the second rollers 42 are alternately disposed in a ring), and are respectively installed in pairs on the mounting shafts on both sides of the support member 20, and the second small diameter end 422 of the second roller 42 with the smaller diameter is embedded in the first small diameter end 412 of the adjacent first roller 41 with the larger diameter, so as to ensure that each roller can rotate and avoid mutual interference.

In this embodiment, the diameter of the first small diameter end 412 of the first roller 41 is larger than the diameter of the second large diameter end 421 of the second roller 42. In other words, the diameter of the first roller 41 is larger than the diameter of the second roller 42.

Because the second distance between the first axis of the first mounting shaft 31 and the wheel center of the hub 10 is less than the third distance between the second axis of the second mounting shaft 32 and the wheel center of the hub 10, the installation position of the second roller 42 with a smaller diameter is closer to the outer extension of the omnidirectional wheel, so as to ensure that the height of the first roller 41 and the height of the second roller 42 are the same at the position in contact with the ground, thereby ensuring that both the first roller 41 and the second roller 42 can contact with the ground in the rolling process.

The first base portion 230 of the support member 20 has a threaded hole 233, and the axis of the threaded hole 233 points to the wheel center, so that the support member 20 can be installed on the hub 10 by a fastener with threads, and the support member 20 can be stably and reliably fixed so as to ensure the stability of the support member 20. The base bottom surface 231 of the first base portion 230 is a flat surface, and there is a slope between the base side surface 232 of the first base portion 230 and the vertical surface of the base bottom surface 231, so as to achieve guiding and positioning. The center of the hub may be installed with an axle (or called a roller). The axle extends out from one side of the hub, the circumference of the hub is evenly distributed with first grooves that can be matched with the base bottom surface and base side surfaces of the support member, the through hole and the threaded hole of the support member are coaxial, a bolt can be screwed into the support member from the wheel center to the outside through the through hole of the hub so as to fix the support member and the hub, and the plurality of support members are installed in the same way.

In the omnidirectional wheel provided by the embodiments of the present disclosure, all the support members have the same structure, and a certain support member can be independently disassembled without affecting other support members. Therefore, in the case where a certain support member is damaged, the damaged support member can be replaced contrapuntally without disassembling other support members, so that the efficiency of installation and maintenance can be improved, and the convenience of installation and maintenance can be improved. All the support members have the same structure, which can effectively reduce the number of molds, reduce the number of repair spare parts, and reduce production costs and maintenance costs.

Figure 11A:
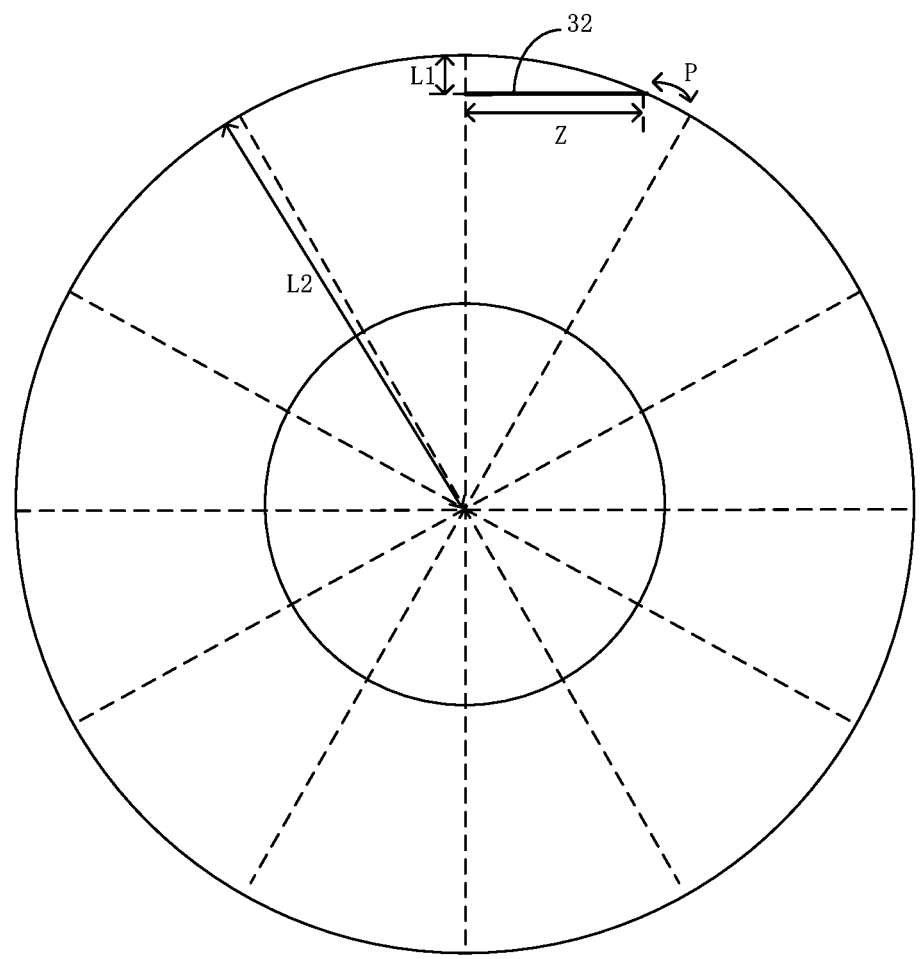
FIG. 11A is a schematic diagram of a size relationship between a first roller and a second roller in an omnidirectional wheel provided by an embodiment of the present disclosure.
Figure 11B:
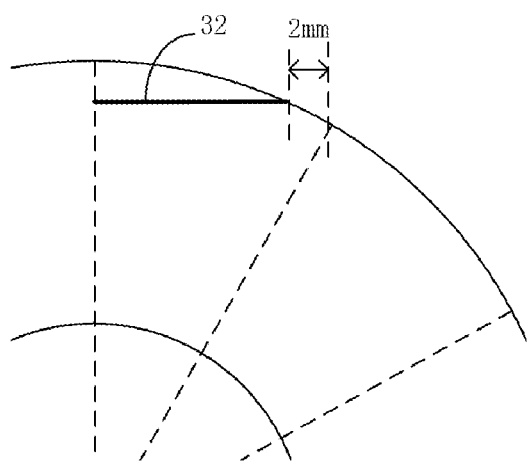
FIG. 11B is a partial enlarged view of FIG. 11A.

FIG. 11A is a schematic diagram of a size relationship between a first roller and a second roller in an omnidirectional wheel provided by an embodiment of the present disclosure; FIG. 11B is a partial enlarged view of FIG. 11A; and FIG. 11C is a schematic diagram of a gap between a first roller and a second roller.

Figure 11C:
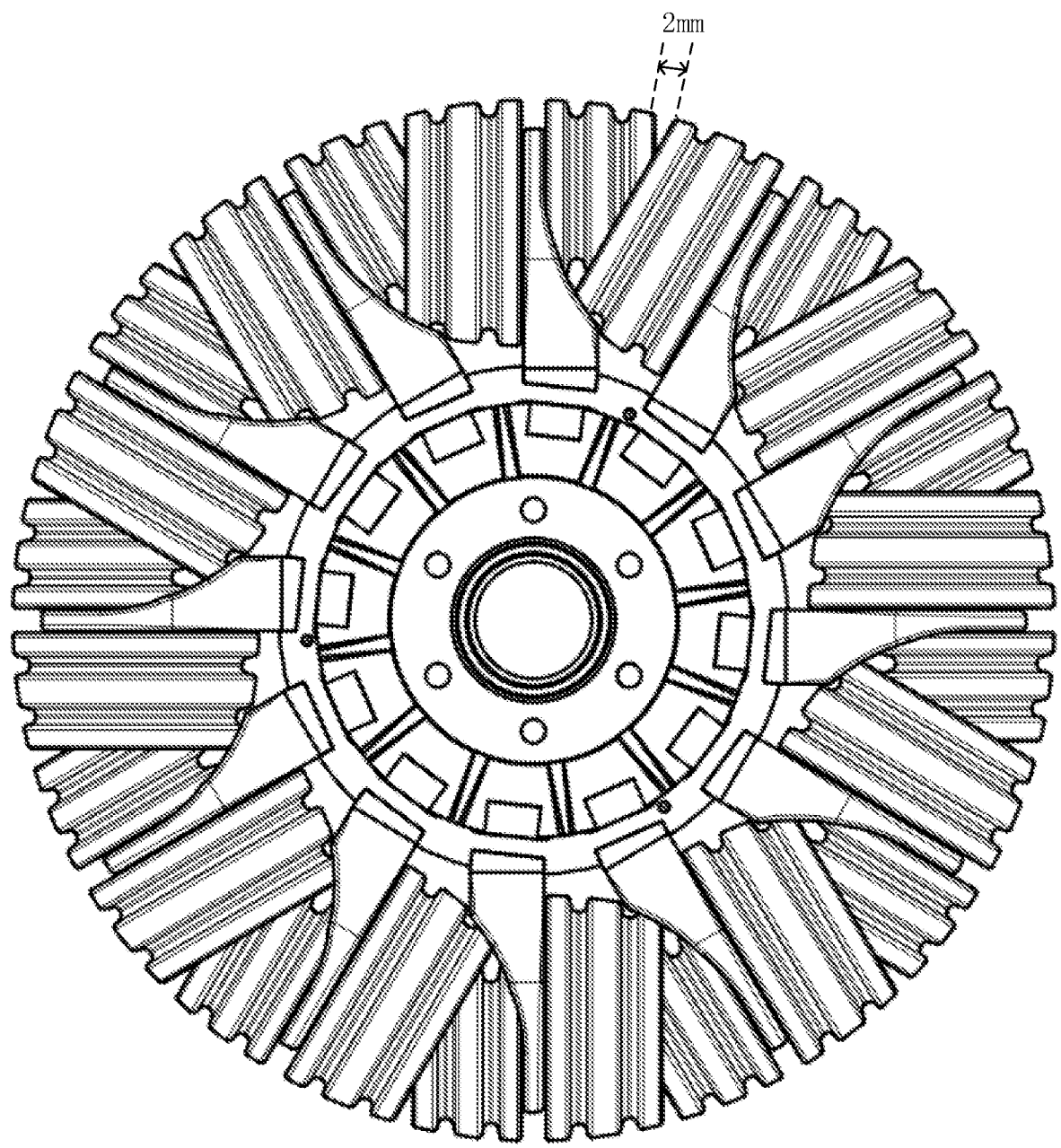
FIG. 11C is a schematic diagram of a gap between a first roller and a second roller in an omnidirectional wheel provided by an embodiment of the present disclosure.

As illustrated in FIGS. 11A-11C, in some examples, in the case where the omnidirectional wheel includes 12 support members 20 and includes 12 first rollers 41 and 12 second rollers 42, in order to ensure the assemblability and strength, in the case where the outer diameter of the omnidirectional wheel is 10 inches (that is, 254 mm) and the gap between the first roller 41 and the second roller 42 that are adjacent is about 2 mm, the diameter of the first large diameter end 411 of the first roller 41 is about 64.5 mm~48.6 mm, and the diameter of the first small diameter end 412 of the first roller 41 is about 15 mm-0 mm. The diameter of the second small diameter end 422 of the second roller 42 is always smaller than the diameter of the first small diameter end 412 of the first roller 41. The second roller 42 does not interfere with the inner wall of the first small diameter end 412 of the first roller 41, so the diameter of the second small diameter end 422 of the second roller 42 depends on the size in the case where the first small diameter end 412 of the first roller 41 contains the second small diameter end 422 of the second roller 42 without interference, and the size can be determined according to actual requirements.

As illustrated in FIG. 11A, assuming that the distance between the second mounting shaft 32 and the outer circumference of the omnidirectional wheel is L1, the radius of the omnidirectional wheel is L2, and the arc length corresponding to the gap between the first roller 41 and the second roller 42 that are adjacent is P, the length Z of the second mounting shaft 32 satisfies: $Z=(L2-L1)*\tan(2\pi/N-P/L2)$. It should be noted that the value N in the above formula represents the number of support members 20 included in the omnidirectional wheel. For example, in some examples, N=12.

For example, as illustrated in FIG. 10A and FIG. 11A, the radius R of the second large diameter end 421 of the second roller 42 can be calculated according to the following formula: $R=L2-\cos(((2\pi/N)*L2-P)/L2)*L2+r$, in which N represents the number of support members 20 included in the omnidirectional wheel, L2 represents the radius of the omnidirectional wheel, P represents the arc length corresponding to the gap between the first roller 41 and the second roller 42 that are adjacent, and r represents the radius of the second small diameter end 422 of the second roller 42.

For example, in order to ensure that the outer circumferences of the first roller 41 and the second roller 42 can form the outer circumference of the omnidirectional wheel, the distance between the first mounting shaft 31 and the second mounting shaft 32 is the difference between the radius of the first large diameter end 411 of the first roller 41 and the radius of the second large diameter end 421 of the second roller 42.

In the case where the size of the omnidirectional wheel remains unchanged, the less the number of the first rollers 41 and the second rollers 42 is, the larger the size difference between the first large diameter end 411 and the first small diameter end 412 of the first roller 41 is, the larger the size difference between the second large diameter end 421 and the second small diameter end 422 of the second roller 42 is, and the larger the size difference between the first roller 41 and the second roller 42 is. Because the number of the first rollers 41 and the second rollers 42 is reduced, the assembly cost may be reduced accordingly. It should be noted that, in the embodiments of the present disclosure, the selection of the number of the first rollers 41 and the second rollers 42 is a process of balancing the structural strength, assembly cost, and appearance experience, and the actual use situation needs to be considered comprehensively. The embodiments of the present disclosure do not limit the number of the first rollers 41 and the second rollers 42.

Figure 12:
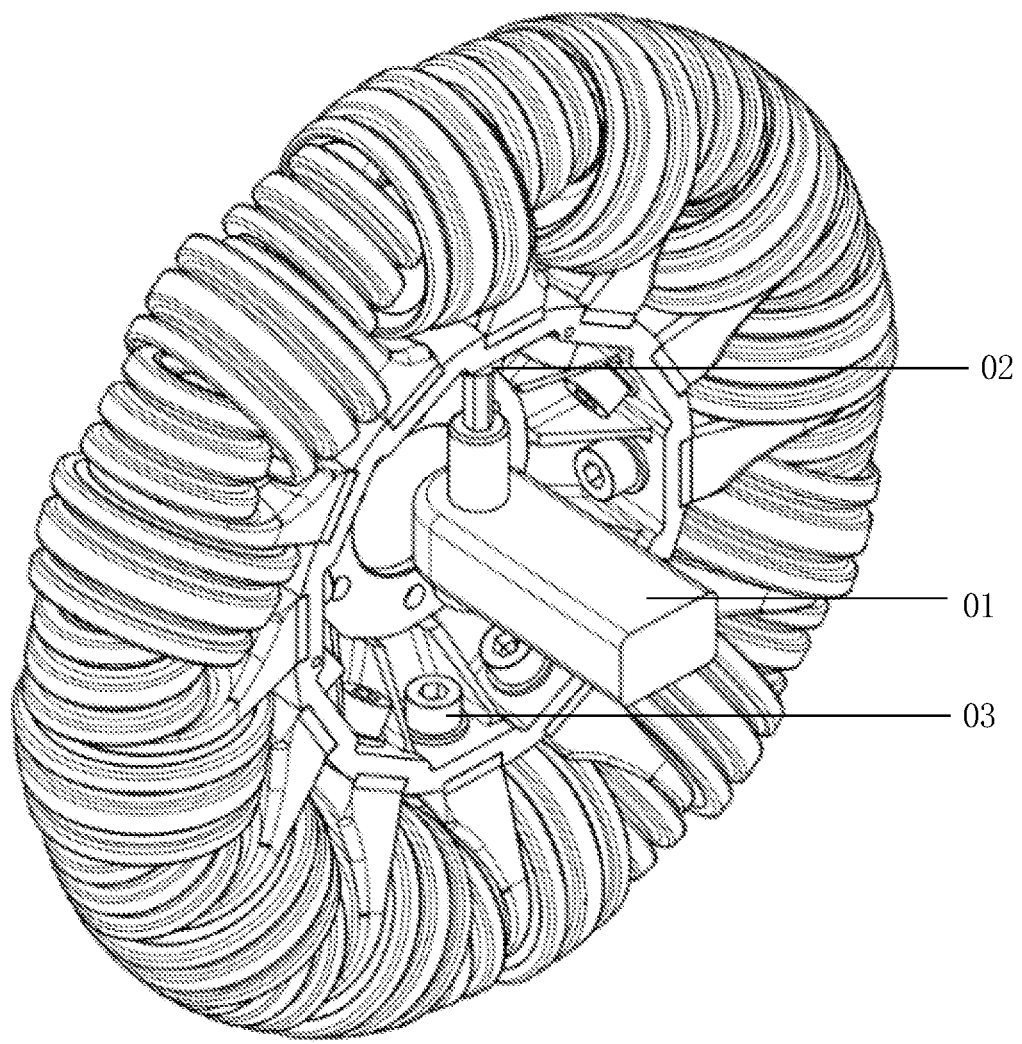
FIG. 12 is a schematic diagram of installation of an omnidirectional wheel provided by an embodiment of the present disclosure.

FIG. 12 is a schematic diagram of installation of an omnidirectional wheel provided by an embodiment of the present disclosure. As illustrated in FIG. 12, a bolt 02 can be screwed into the support member 20 radially, and a right-angle ratchet wrench 01 is used to cooperate with a hexagon head or a sleeve to tighten the bolt 02, so that the hub 10 and the support member 20 are tightened and fixed. The flange plate 101 is biased to a side of the omnidirectional wheel, thereby leaving operation space. For example, in some examples, the distance between the bolt 02 used to install the support member 20 and the bolt 03 at the other end of the same diameter of the hub main body 102 as the bolt 02 is at least 64 mm, and the distance between the axis of the bolt 02 and the flange plate 101 is at least 13 mm. For example, when the bolt is installed, the bolt cannot interfere with the reinforcing ribs 103 of the hub 10. In order to ensure strength, for example, the M8 bolt can be used. For example, bolts of the same type may be used to install all the support members 20.

Figure 13A:
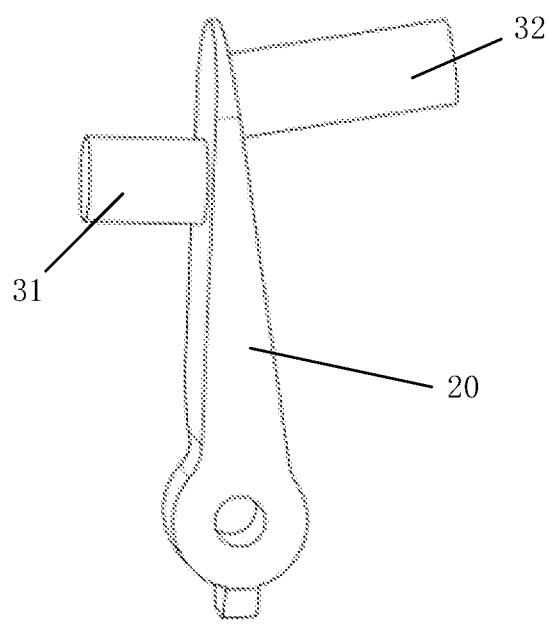
FIG. 13A is a schematic diagram of a support member of another omnidirectional wheel provided by an embodiment of the present disclosure.
Figure 13B:
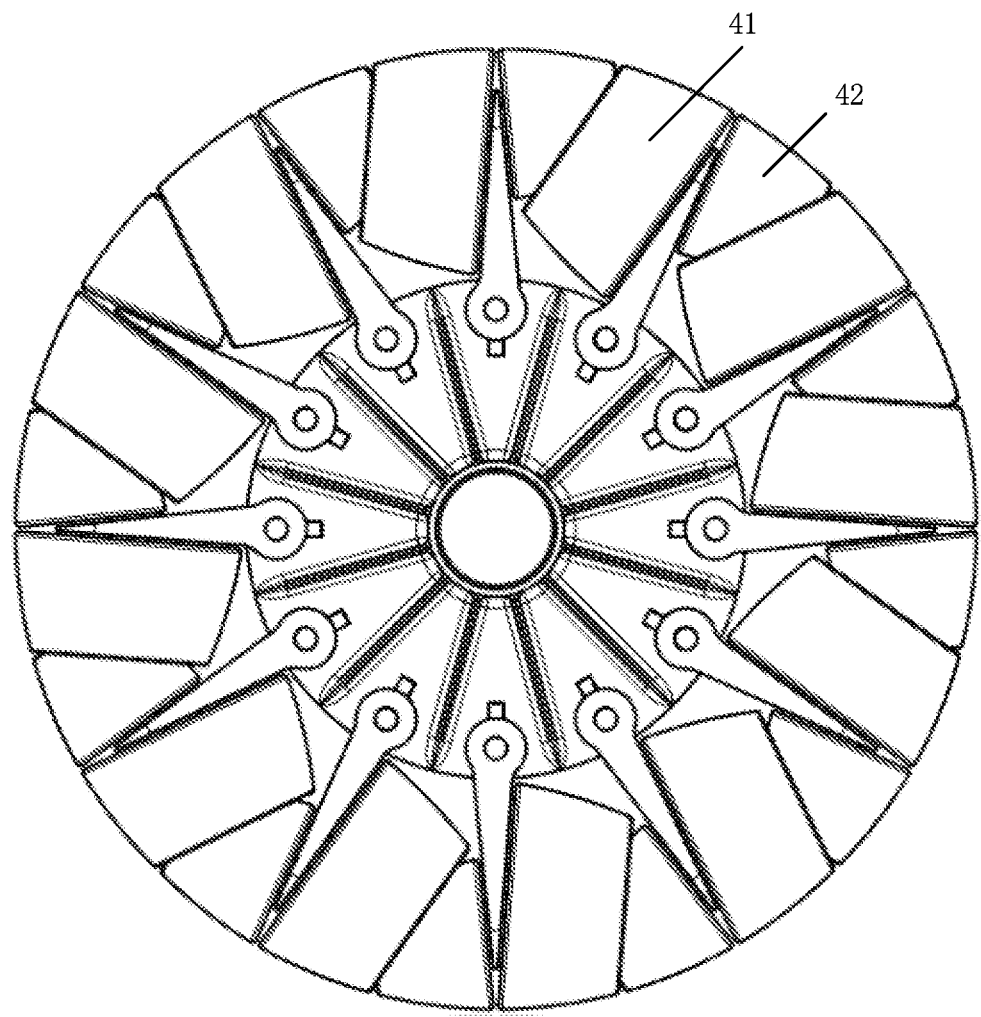
FIGS. 13B-13C are schematic diagrams of an omnidirectional wheel adopting the support member in FIG. 13A.
Figure 13C:
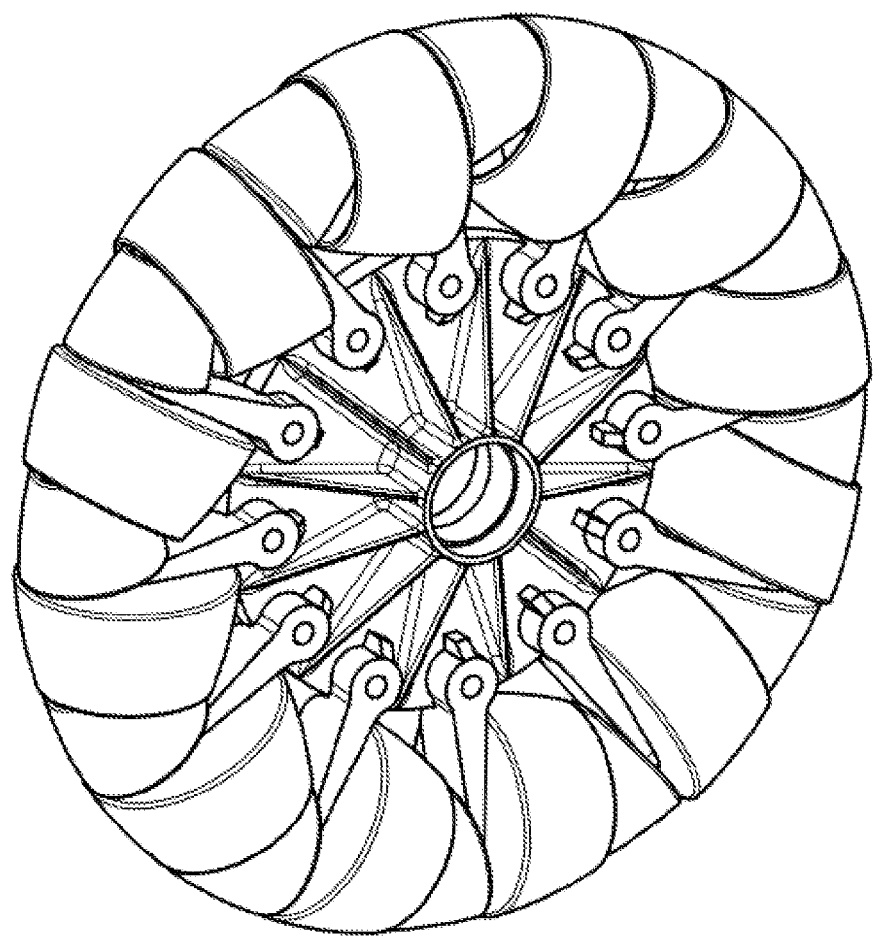

FIG. 13A is a schematic diagram of a support member of another omnidirectional wheel provided by an embodiment of the present disclosure; and FIGS. 13B-13C are schematic diagrams of an omnidirectional wheel adopting the support member in FIG. 13A. For example, as illustrated in FIGS. 13A-13C, in this embodiment, for the same support member 20, the first axis of the first mounting shaft 31 and the second axis of the second mounting shaft 32 have an angle less than 180 degrees, that is, the first axis and the second axis are not parallel. In this way, the gap between the first roller 41 and the second roller 42 that are adjacent can be reduced, and the flatness of the edge of the omnidirectional wheel can be improved. As illustrated in FIG. 13B and FIG. 13C, the gap between the first roller 41 and the second roller 42 that are adjacent is small, and the flatness of the edge of the omnidirectional wheel is improved. For example, the angle between the first axis and the second axis may be 120 degrees, 140 degrees, 160 degrees, or any other angle, which is not limited in the embodiments of the present disclosure. For example, the shape of the portion of the support member 20 for connecting with the hub 10 is different from the shape of the support member 20 illustrated in FIG. 8, and the opening direction of the threaded hole for mounting the bolt is also different from the support member 20 illustrated in FIG. 8, this is a reasonable deformation, and can also realize the function of the support member 20.

Figure 14A:
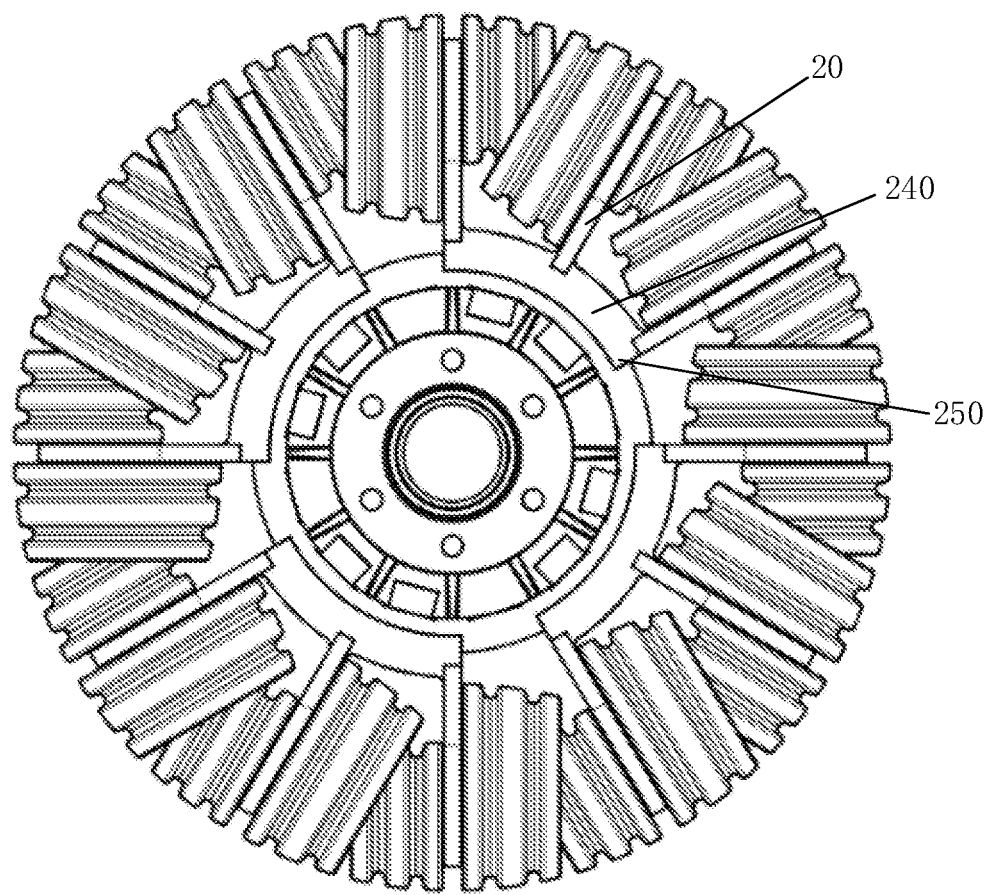
FIGS. 14A-14B are schematic diagrams of another omnidirectional wheel provided by an embodiment of the present disclosure.
Figure 14B:
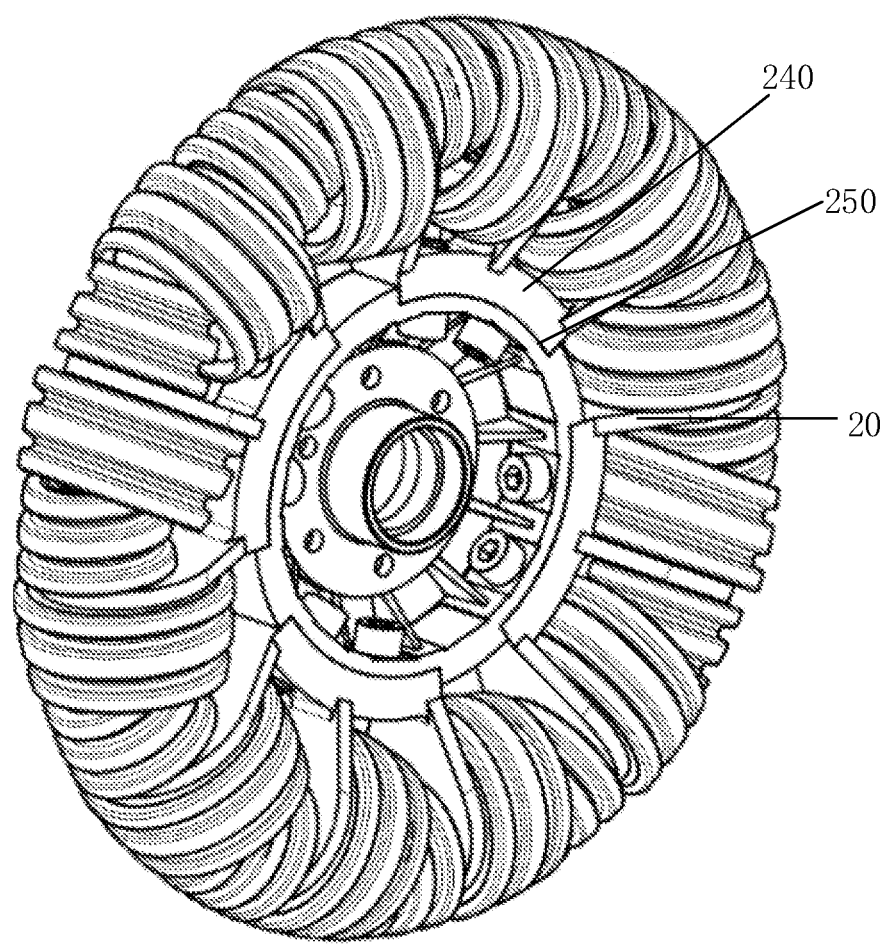

FIGS. 14A-14B are schematic diagrams of another omnidirectional wheel provided by an embodiment of the present disclosure. For example, as illustrated in FIGS. 14A-14B, in this embodiment, the plurality of support members 20 are divided into a plurality of groups, each group includes at least two support members 20, support members 20 in the same group are integrally formed on the same second base portion 240, and support members 20 in different groups are formed on different second base portions 240. For example, two support members 20 may be a group and formed on a same second base portion 240, or three support members 20 may be a group and formed on a same second base portion 240 (the case is illustrated in FIGS. 14A-14B), or four support members 20 may also be a group and formed on a same second base portion 240, and the number of support members 20 in each group is not limited, which can be determined according to actual requirements. For example, the numbers of the support members 20 in respective groups may be the same or different, which is not limited in the embodiments of the present disclosure.

For example, correspondingly, a plurality of second grooves 250 are provided on the hub 10, and the plurality of second grooves 250 are disposed at intervals along the circumferential direction of the distribution circumference of the plurality of support members 20. The plurality of second grooves 250 are disposed in one-to-one correspondence with the plurality groups of support members 20, and the number of the second grooves 250 is equal to the number of groups of the support members 20. The second groove 250 is configured to provide an installation space for the second base portion 240 so as to enable a corresponding group of support members 20 to be installed on the hub 10.

Through the above method, the number of elements of the omnidirectional wheel can be reduced, the installation efficiency can be improved, the accumulated assembly error can be reduced, and the assembly accuracy can be improved.

Figure 15A:
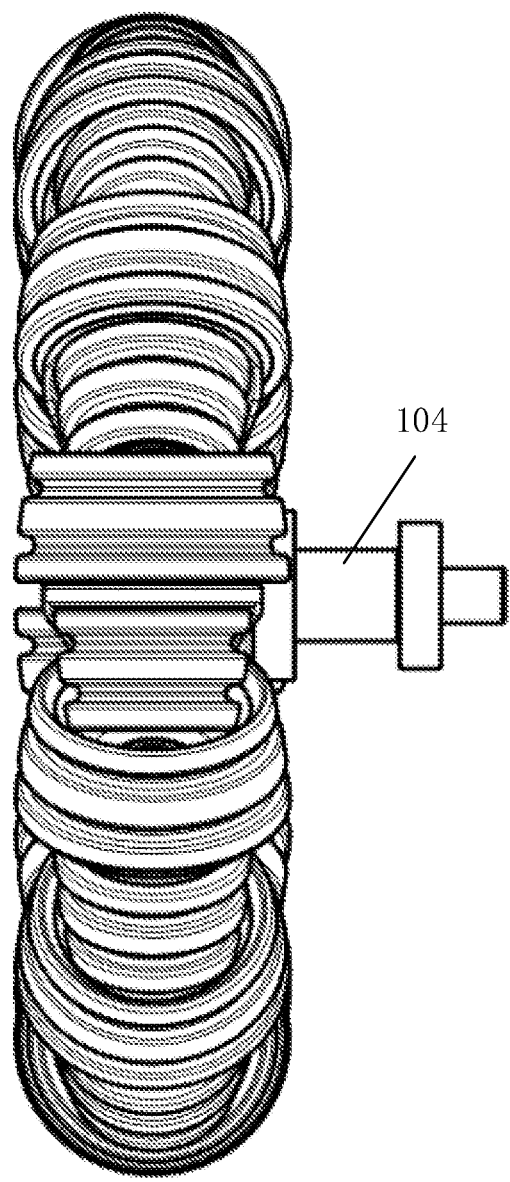
FIGS. 15A-15C are schematic diagrams of another omnidirectional wheel provided by an embodiment of the present disclosure.
Figure 15B:
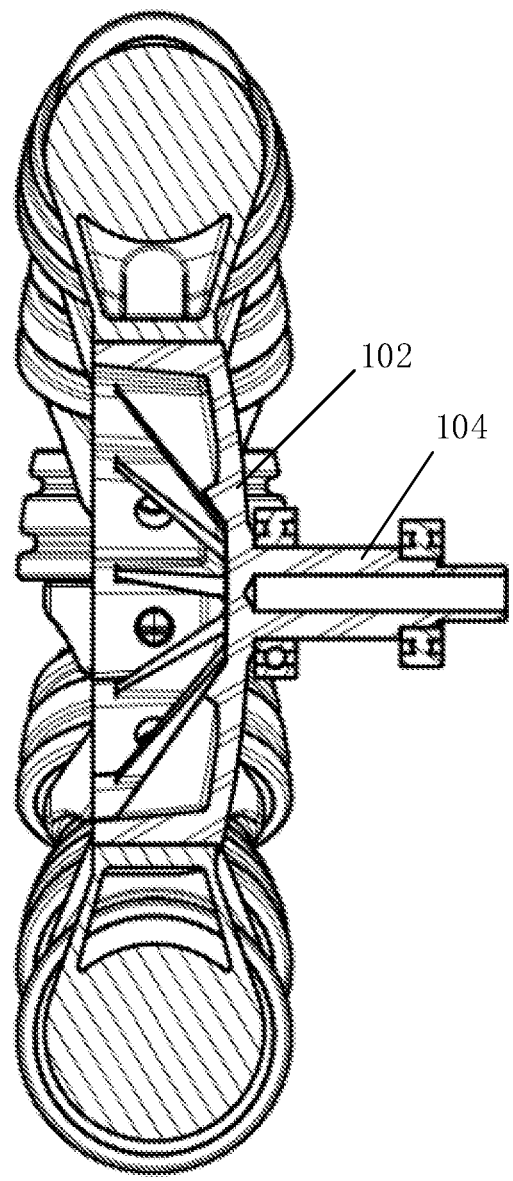
Figure 15C:
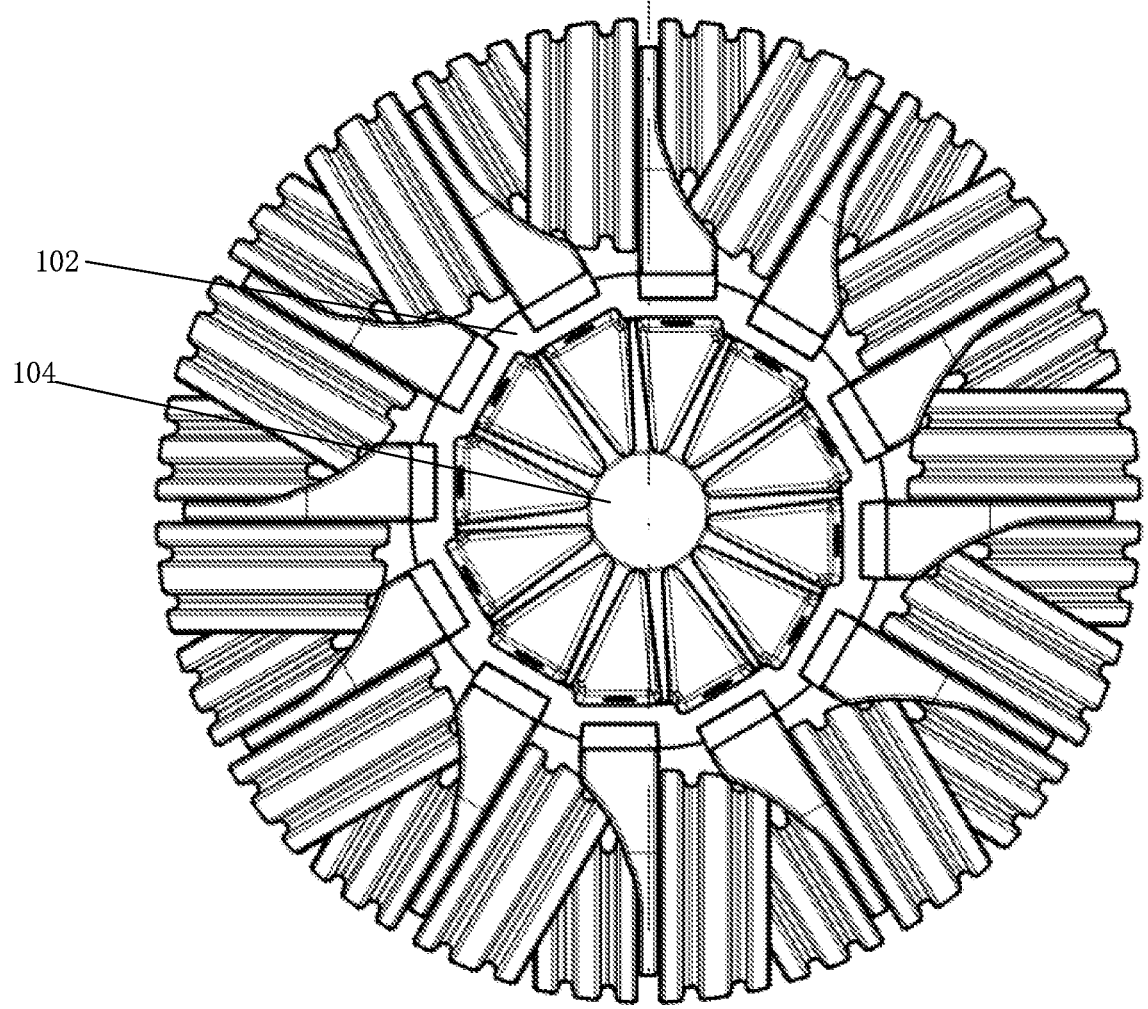

FIGS. 15A-15C are schematic diagrams of another omnidirectional wheel provided by an embodiment of the present disclosure. For example, as illustrated in FIGS. 15A-15C, in this embodiment, the hub 10 includes a hub main body 102 and an axle 104, the axle 104 is located on the axis of the hub 10, and the axle 104 and the hub main body 102 are an integral structure. For example, the hub 10 can be manufactured by any applicable manufacturing method such as a casting process or a turning and milling process. By making the axle 104 and the hub main body 102 into an integral structure, the process of installing the axle can be omitted, installation errors can be avoided, and the connection strength can be improved.

Figure 16A:
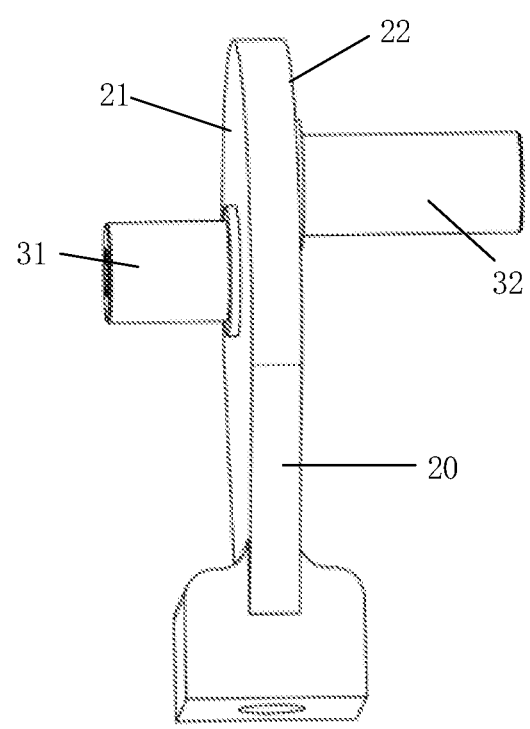
FIG. 16A is a schematic diagram of a support member of another omnidirectional wheel provided by an embodiment of the present disclosure.
Figure 16B:
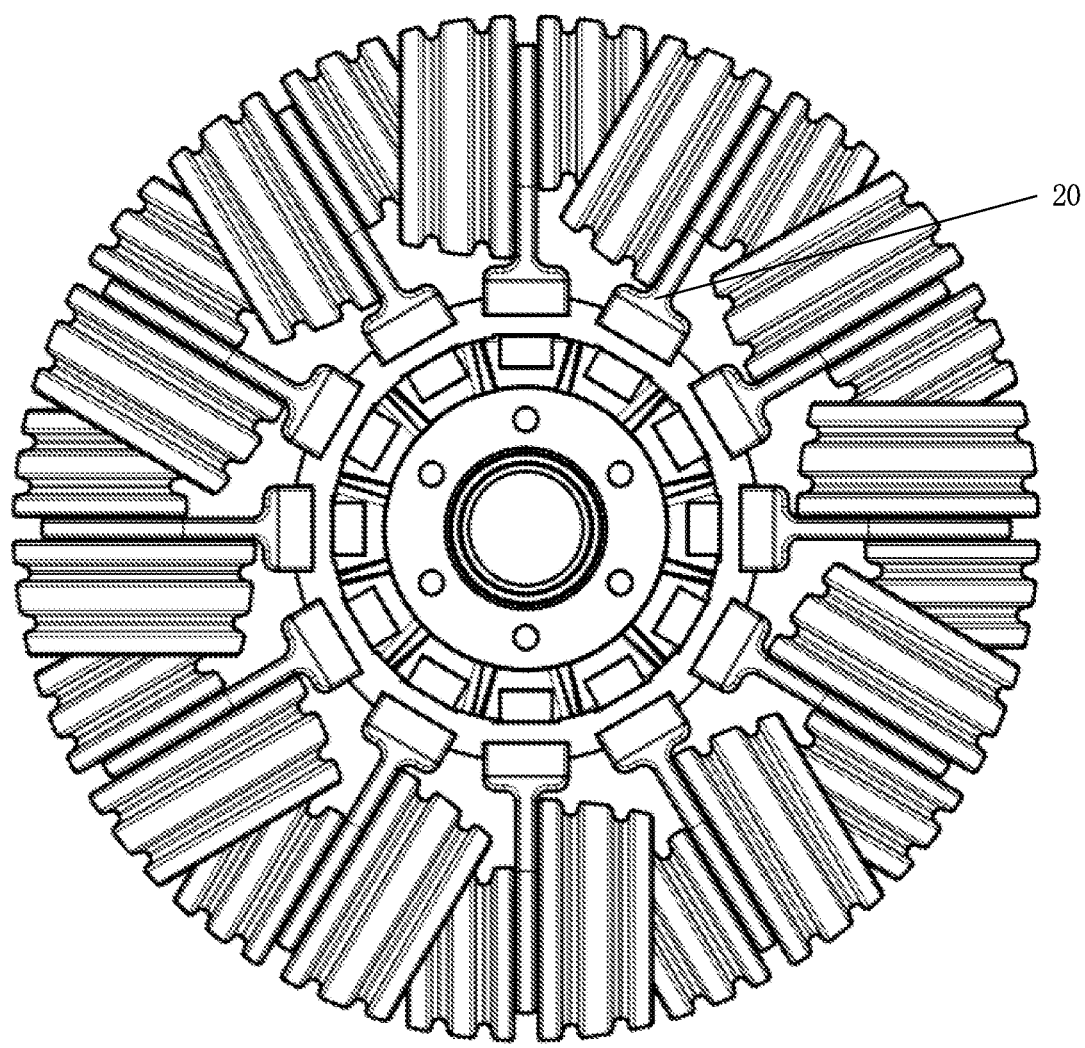
FIGS. 16B-16C are schematic diagrams of an omnidirectional wheel adopting the support member in FIG. 16A.
Figure 16C:
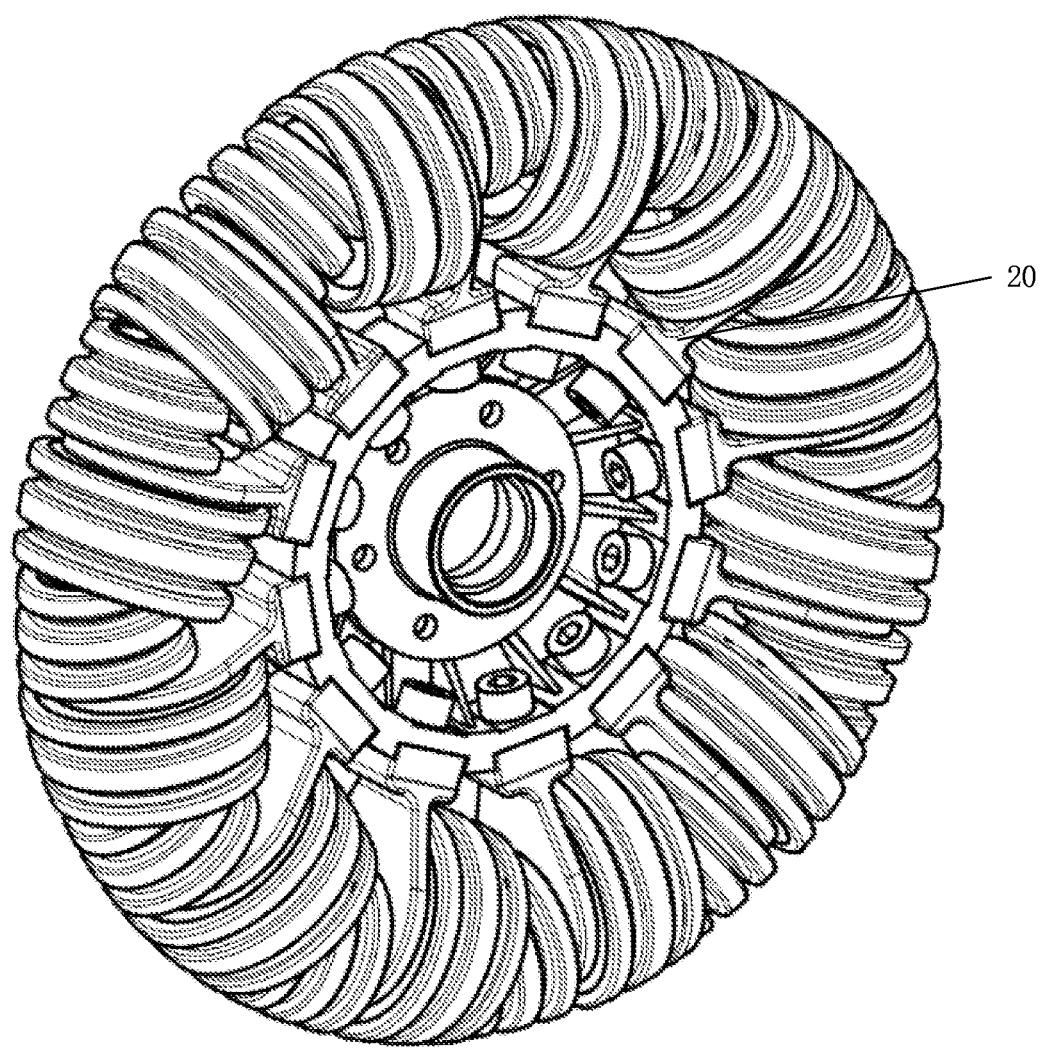

FIG. 16A is a schematic diagram of a support member of another omnidirectional wheel provided by an embodiment of the present disclosure; and FIGS. 16B-16C are schematic diagrams of an omnidirectional wheel adopting the support member in FIG. 16A. For example, as illustrated in FIGS. 16A-16C, in this embodiment, both the first mounting surface 21 of the support member 20 and the second mounting surface 22 of the support member 20 are curved surfaces or flat surfaces. For the same support member 20, the first mounting surface 21 and the second mounting surface 22 are symmetrical to each other. In this way, the force uniformity of the support member 20 can be improved, thereby improving the structural strength.

It should be noted that, in the embodiments of the present disclosure, the omnidirectional wheel is not limited to include the structures and components described above, but may also include more structures and components, for example, may also include a hub cover plate provided on the hub to prevent dust and protect and beautify the hub, which can be determined according to actual needs, and the embodiments of the present disclosure are not limited in this aspect. In addition, the structures and features of the omnidirectional wheels described in the foregoing embodiments and examples can be combined with each other to obtain more types of omnidirectional wheels.

At least one embodiment of the present disclosure further provides an omnidirectional wheel. The omnidirectional wheel includes a hub, a plurality of support members, a plurality of first rollers, and a plurality of second rollers. The plurality of support members are circumferentially distributed on the hub, each of the support members has a first mounting surface and a second mounting surface disposed oppositely, the first mounting surface is provided with a first mounting shaft, the second mounting surface is provided with a second mounting shaft, and a distance between a first axis of the first mounting shaft and a wheel center of the hub is less than a distance between a second axis of the second mounting shaft and the wheel center of the hub. At least one of the first rollers is rotatably disposed on each first mounting shaft; and at least one of the second rollers is rotatably disposed on each second mounting shaft. Along a circumferential direction of a distribution circumference of the plurality of support members, the plurality of first rollers and the plurality of second rollers are disposed at intervals in sequence, one of the second rollers is disposed between two adjacent first rollers, and one of the first rollers is disposed between two adjacent second rollers. The first roller has a first large diameter end and a first small diameter end, a diameter of the first large diameter end is larger than a diameter of the first small diameter end, and the first small diameter end has an accommodating hole. The second roller has a second large diameter end and a second small diameter end, a diameter of the second large diameter end is larger than a diameter of the second small diameter end, and the second small diameter end of the second roller is at least partially embedded in the accommodating hole of the first small diameter end of an adjacent first roller. The diameter of the first small diameter end of the first roller is larger than the diameter of the second large diameter end of the second roller. For a same support member, the first axis of the first mounting shaft and the second axis of the second mounting shaft are parallel to each other. The hub is provided with a plurality of first grooves, and the plurality of first grooves are disposed at intervals along a circumferential direction of a distribution circumference of the plurality of support members, and the plurality of first grooves are disposed in one-to-one correspondence with the plurality of support members. Each of the first grooves includes a bottom mounting surface and two side mounting surfaces, and the two side mounting surfaces are disposed at intervals along the circumferential direction of the distribution circumference, and the first groove is configured to provide an installation space for the support member so as to enable the support member to be installed on the hub. The support member includes a first base portion that is matched with the first groove, the first base portion includes a base bottom surface and two base side surfaces on both sides of the base bottom surface, and the first base portion is configured to match the first groove so as to enable the support member to be installed on the hub. The first base portion is provided with a threaded hole, and an axis of the threaded hole points to the wheel center of the hub. A bottom of the first groove is provided with a through hole, and in the case where the first base portion of the support member is inserted into the first groove, the through hole is concentric with the threaded hole on the corresponding first base portion. A length of the first mounting shaft is less than a length of the second mounting shaft.

For the detailed descriptions and technical effects of the omnidirectional wheel, reference can be made to the above contents, which is not repeated here.

Embodiments of the present disclosure further provide a scooter, the scooter includes a seat and at least one omnidirectional wheel, the omnidirectional wheel is rotatably disposed on at least one side of the seat, and the omnidirectional wheel is the omnidirectional wheel provided by any embodiment of the present disclosure. The scooter is equipped with the aforementioned omnidirectional wheel. The omnidirectional wheel has a simple structure, which can lower the difficulty of installation and maintenance, improve the efficiency of installation and maintenance, reduce production and maintenance costs, and can ensure stability and parallelism during operation, and have a better user experience.

Figure 17:
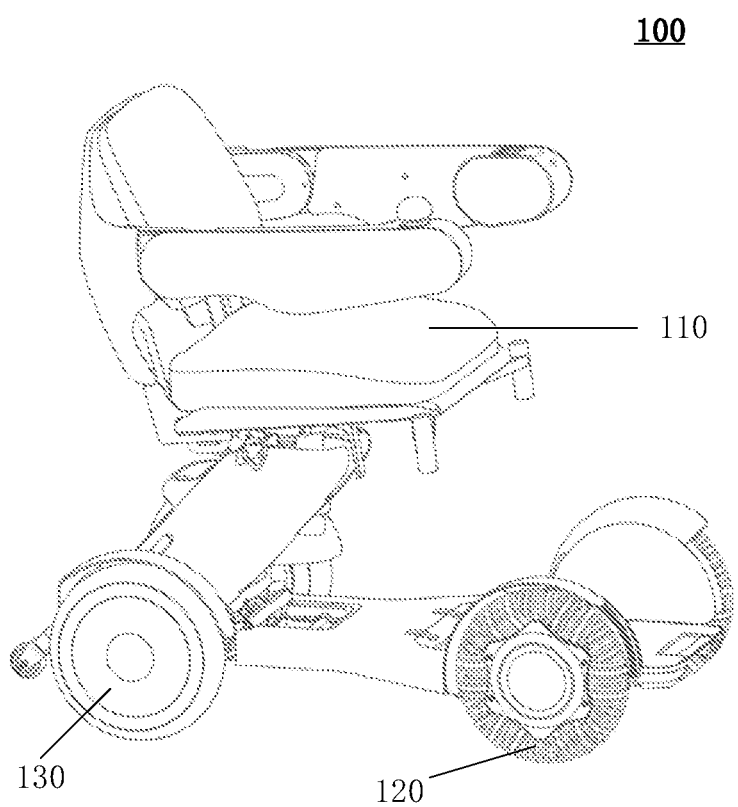
FIG. 17 is a schematic diagram of a scooter provided by an embodiment of the present disclosure.

FIG. 17 is a schematic diagram of a scooter provided by an embodiment of the present disclosure. For example, as illustrated in FIG. 17, a scooter 100 includes a seat 110 and at least one omnidirectional wheel 120. The omnidirectional wheel 120 is rotatably disposed on at least one side of the seat 110 (for example, on both sides). The omnidirectional wheel 120 is the omnidirectional wheel provided by any embodiment of the present disclosure. FIG. 17 only schematically illustrates the installation position of the omnidirectional wheel 120, and does not illustrate the specific structure of the omnidirectional wheel 120. For the specific structure of the omnidirectional wheel 120, reference can be made to the above contents, which are not repeated here.

For example, in some examples, the scooter 100 includes two omnidirectional wheels 120 and further includes two non-omnidirectional wheels 130. For example, the two omnidirectional wheels 120 are provided at the left front side and right front side of the seat 110, and the two non-omnidirectional wheels 130 are provided at the left rear side and right rear side of the seat 110. When the scooter 100 needs to move, the omnidirectional wheels 120 adjusts the moving direction according to the needs of the user, so as to achieve forward movement, backward movement, lateral movement, and the like.

It should be noted that, in the embodiments of the present disclosure, the scooter 100 may further include more components, for example, further include a battery, a control circuit, a brake, etc., so as to have more comprehensive functions, and the embodiments of the present disclosure are not limited in this aspect. The scooter 100 is not limited to only include two omnidirectional wheels 120, and four wheels of the scooter 100 may all adopt omnidirectional wheels 120 to improve the flexibility and stability of movement. For the detailed descriptions and technical effects of the scooter 100, reference can be made to the above descriptions of the omnidirectional wheel, which are not repeated here.

The above implementations are only used to illustrate the embodiments of the present disclosure, and are not intended to limit the embodiments of the present disclosure. Those of ordinary skill in the relevant technical field can also make various modifications without departing from the spirit and scope of the embodiments of the present disclosure, and all equivalent technical solutions also belong to the scope of the embodiments of the present disclosure, and the protection scope of the embodiments of the present disclosure should be defined by the claims.

What is claimed is:

1. An omnidirectional wheel, comprising:
a hub;
a plurality of support members, wherein the plurality of support members are circumferentially distributed on the hub, each of the support members has a first mounting surface and a second mounting surface disposed opposite to one another, the first mounting surface is provided with a first mounting shaft, the second mounting surface is provided with a second mounting shaft, and a distance between a first axis of the first mounting shaft and a wheel center of the hub is less than a distance between a second axis of the second mounting shaft and the wheel center of the hub;
a plurality of first rollers, wherein at least one first roller of the first rollers is rotatably disposed on each first mounting shaft; and
a plurality of second rollers, wherein at least one second roller of the second rollers is rotatably disposed on each second mounting shaft.

2. The omnidirectional wheel according to claim 1, wherein, along a circumferential direction of a distribution circumference of the plurality of support members, the plurality of first rollers and the plurality of second rollers are disposed at intervals in sequence, one of the second rollers is between two adjacent first rollers, and one of the first rollers is between two adjacent second rollers.

3. The omnidirectional wheel according to claim 1, wherein each of the first rollers has a first large diameter end and a first small diameter end, a diameter of the first large diameter end is larger than a diameter of the first small diameter end, and the first small diameter end has an accommodating hole,
each of the second rollers has a second large diameter end and a second small diameter end, a diameter of the second large diameter end is larger than a diameter of the second small diameter end, and
the second small diameter end of each of the second rollers is at least partially embedded in the accommodating hole of the first small diameter end of an adjacent first roller.

4. The omnidirectional wheel according to claim 3, wherein the diameter of the first small diameter end of each of the first rollers is larger than the diameter of the second large diameter end of each of the second rollers.

5. The omnidirectional wheel according to claim 1, wherein, for a same support member, the first axis of the first mounting shaft is parallel to the second axis of the second mounting shaft.

6. The omnidirectional wheel according to claim 1, wherein, for a same support member, the first axis of the first mounting shaft and the second axis of the second mounting shaft have an angle less than 180 degrees therebetween.

7. The omnidirectional wheel according to claim 1, wherein the hub is provided with a plurality of first grooves, the plurality of first grooves are disposed at intervals along a circumferential direction of a distribution circumference of the plurality of support members, the plurality of first grooves are disposed in one-to-one correspondence with the plurality of support members, each first groove of the first grooves comprises a bottom mounting surface and two side mounting surfaces, the two side mounting surfaces are disposed at intervals along the circumferential direction of the distribution circumference, and each of the first grooves is configured to provide an installation space for a support member corresponding to the first groove, so as to enable the support member to be installed on the hub.

8. The omnidirectional wheel according to claim 7, wherein the support member comprises a first base portion that is matched with the first groove, the first base portion comprises a base bottom surface and two base side surfaces on both sides of the base bottom surface, and the first base portion is configured to match the first groove so as to enable the support member to be installed on the hub.

9. The omnidirectional wheel according to claim 8, wherein a distance between the two side mounting surfaces of at least one first groove of the first grooves decreases along a direction from an opening of the first groove to a corresponding bottom mounting surface, or the two side mounting surfaces of at least one first groove of the first grooves are perpendicular to a corresponding bottom mounting surface; and
   a distance between the two base side surfaces of at least one first base portion decreases in a direction approaching a corresponding base bottom surface, or the two base side surfaces of at least one first base portion are perpendicular to a corresponding base bottom surface.

10. The omnidirectional wheel according to claim 8, wherein the two side mounting surfaces of at least one first groove of the first grooves are not perpendicular to a corresponding bottom mounting surface, and angles respectively between the two side mounting surfaces and the corresponding bottom mounting surface are different; and
   the two base side surfaces of at least one first base portion are not perpendicular to a corresponding base bottom surface, and angles respectively between the two base side surfaces and the corresponding base bottom surface are different.

11. The omnidirectional wheel according to claim 8, wherein the first base portion is provided with a threaded hole, and an axis of the threaded hole points to the wheel center of the hub.

12. The omnidirectional wheel according to claim 11, wherein a bottom of the first groove is provided with a through hole, and in a case where the first base portion of the support member is inserted into the first groove, the through hole is concentric with a corresponding threaded hole on the first base portion.

13. The omnidirectional wheel according to claim 1, wherein the plurality of support members are divided into a plurality of groups, each group of the plurality of groups comprises at least two support members, support members in a same group are integrally formed on a same second base portion, and support members in different groups are formed on different second base portions, the hub is provided with a plurality of second grooves, the plurality of second grooves are disposed at intervals along a circumferential direction of a distribution circumference of the plurality of support members, the plurality of second grooves are disposed in one-to-one correspondence with the plurality of groups of support members, and each of the second grooves is configured to provide an installation space for the second base portion so as to enable a corresponding group of support members to be installed on the hub.

14. The omnidirectional wheel according to claim 1, wherein a length of the first mounting shaft is less than a length of the second mounting shaft.

15. The omnidirectional wheel according to claim 1, wherein the hub comprises a flange plate, a hub main body, and a plurality of reinforcing ribs,
   a center of the flange plate and the wheel center of the hub are both on an axis of the hub,
   the hub main body surrounds the flange plate, the hub main body comprises two sides distributed along the axis of the hub, and the flange plate is on one side of the two sides of the hub main body,
   the plurality of reinforcing ribs are distributed at intervals along a circumferential direction of the hub, the reinforcing ribs are in the hub main body and on a side of the flange plate, and the reinforcing ribs extend from an inner wall of the hub main body to the flange plate.

16. The omnidirectional wheel according to claim 1, wherein the hub comprises a hub main body and an axle, the axle is on an axis of the hub, and the axle and the hub main body are an integral structure.

17. The omnidirectional wheel according to claim 1, wherein one of the first mounting surface and the second mounting surface of each of the support members is a curved surface and another one of the first mounting surface and the second mounting surface of each of the support members is a plane; or
   the first mounting surface and the second mounting surface of each of the support members are both curved surfaces or planes, and for a same support member, the first mounting surface and the second mounting surface are symmetrical.

18. An omnidirectional wheel, comprising:
   a hub;
   a plurality of support members, wherein the plurality of support members are circumferentially distributed on the hub, each of the support members has a first mounting surface and a second mounting surface disposed opposite one another, the first mounting surface is provided with a first mounting shaft, the second mounting surface is provided with a second mounting shaft, and a distance between a first axis of the first mounting shaft and a wheel center of the hub is less than a distance between a second axis of the second mounting shaft and the wheel center of the hub;
   a plurality of first rollers, wherein at least one first roller of the first rollers is rotatably disposed on each first mounting shaft; and
   a plurality of second rollers, wherein at least one second roller of the second rollers is rotatably disposed on each second mounting shaft;
   wherein, along a circumferential direction of a distribution circumference of the plurality of support members, the plurality of first rollers and the plurality of second rollers are disposed at intervals in sequence, one of the second rollers is between two adjacent first rollers, and one of the first rollers is between two adjacent second rollers;

each of the first rollers has a first large diameter end and a first small diameter end, a diameter of the first large diameter end is larger than a diameter of the first small diameter end, and the first small diameter end has an accommodating hole, each of the second rollers has a second large diameter end and a second small diameter end, a diameter of the second large diameter end is larger than a diameter of the second small diameter end, and the second small diameter end of each of the second rollers is at least partially embedded in the accommodating hole of the first small diameter end of an adjacent first roller;

the diameter of the first small diameter end of each of the first rollers is larger than the diameter of the second large diameter end of each of the second rollers;

for a same support member, the first axis of the first mounting shaft is parallel to the second axis of the second mounting shaft;

the hub is provided with a plurality of first grooves, the plurality of first grooves are disposed at intervals along a circumferential direction of a distribution circumference of the plurality of support members, the plurality of first grooves are disposed in one-to-one correspondence with the plurality of support members, each first groove of the first grooves comprises a bottom mounting surface and two side mounting surfaces, the two side mounting surfaces are disposed at intervals along the circumferential direction of the distribution circumference, and each of the first grooves is configured to provide an installation space for a support member corresponding to the first groove, so as to enable the support member to be installed on the hub;

the support member comprises a first base portion that is matched with the first groove, the first base portion comprises a base bottom surface and two base side surfaces on both sides of the base bottom surface, and the first base portion is configured to match the first groove so as to enable the support member to be installed on the hub;

the first base portion is provided with a threaded hole, and an axis of the threaded hole points to the wheel center of the hub;

a bottom of the first groove is provided with a through hole, and in a case where the first base portion of the support member is inserted into the first groove, the through hole is concentric with a corresponding threaded hole on the first base portion; and a length of the first mounting shaft is less than a length of the second mounting shaft.

19. A scooter, comprising a seat and at least one omnidirectional wheel, wherein the omnidirectional wheel is rotatably disposed on at least one side of the seat, and the omnidirectional wheel is the omnidirectional wheel according to claim 1.

20. A scooter, comprising a seat and at least one omnidirectional wheel, wherein the omnidirectional wheel is rotatably disposed on at least one side of the seat, and the omnidirectional wheel is the omnidirectional wheel according to claim 18.

* * * * *